(12) United States Patent
Tsuji et al.

(10) Patent No.: US 7,009,004 B2
(45) Date of Patent: Mar. 7, 2006

(54) PROCESS FOR PRODUCING VINYL POLYMER HAVING ALKENYL GROUP AT END VINYL POLYMER AND CURABLE COMPOSITION

(75) Inventors: Ryotaro Tsuji, Settsu (JP); Tomoki Hiiro, Settsu (JP)

(73) Assignee: Kaneka Corporation, Osaka (JP)

( * ) Notice: Subject to any disclaimer, the term of this patent is extended or adjusted under 35 U.S.C. 154(b) by 200 days.

(21) Appl. No.: 10/469,345

(22) PCT Filed: Feb. 21, 2002

(86) PCT No.: PCT/JP02/01581

§ 371 (c)(1),
(2), (4) Date: Aug. 28, 2003

(87) PCT Pub. No.: WO02/072642

PCT Pub. Date: Sep. 19, 2002

(65) Prior Publication Data

US 2004/0097678 A1    May 20, 2004

(30) Foreign Application Priority Data

Mar. 13, 2001 (JP) .............................. P2001-70736

(51) Int. Cl.
*C08F 251/00* (2006.01)
(52) U.S. Cl. ..................... 525/261; 525/259; 525/262; 525/291; 526/222

(58) Field of Classification Search ................ 525/259, 525/261, 262, 291; 526/222
See application file for complete search history.

(56) References Cited

U.S. PATENT DOCUMENTS

| 6,153,705 A | * | 11/2000 | Corpart et al. | ............... 525/244 |
| 6,545,098 B1 | * | 4/2003 | Bouhadir et al. | ........... 525/244 |
| 6,642,318 B1 | * | 11/2003 | Chiefari et al. | ............. 525/261 |

FOREIGN PATENT DOCUMENTS

| EP | 0 348 166 | * 12/1989 |
| WO | WO 98/01478 | 1/1998 |
| WO | WO 99/05099 | 2/1999 |
| WO | WO 99/31144 | 6/1999 |
| WO | WO 00/02939 | 1/2000 |

* cited by examiner

*Primary Examiner*—Helen L. Pezzuto
(74) *Attorney, Agent, or Firm*—Kenyon & Kenyon

(57) ABSTRACT

Objects of the present invention are to provide a process for easily producing an alkenyl-terminated vinyl polymer without using a metal compound requiring a complicated purification step, and to provide a curable composition containing the vinyl polymer. An alkenyl group is incorporated into an end of a vinyl polymer having a thiocarbonylthio structure at the end to produce an alkenyl-terminated vinyl polymer. Mixing this vinyl polymer with a compound having a hydrogen-silicon bond and a hydrosilylation catalyst gives the curable composition.

10 Claims, No Drawings

PROCESS FOR PRODUCING VINYL POLYMER HAVING ALKENYL GROUP AT END VINYL POLYMER AND CURABLE COMPOSITION

CROSS-REFERENCE TO RELATED APPLICATIONS

This application is a 371 national phase application of PCT/JP02/01581, filed on Feb. 21, 2002, claiming priority to Japanese Application No. 2001-70736, filed on Mar. 13, 2001.

TECHNICAL FIELD

The present invention relates to a process for producing an alkenyl-terminated vinyl polymer, the vinyl polymer, and a curable composition containing the vinyl polymer as an essential component.

BACKGROUND ART

Polymers having alkenyl functional groups at their molecular ends are known to be crosslinked in combination with proper curing agents to produce cured compositions having high heat resistance, weathering resistance, etc. For example, they are crosslinked or cured with a compound having a hydrogen-silicon bond as a curing agent, or by using photoreaction.

Examples of known main chains for polymers having alkenyl end groups are polyethers, such as poly(ethylene oxide) and poly(propylene oxide); hydrocarbon polymers, such as polyisobutylene, polybutadiene, polyisoprene, polychloroprene, hydrogenated polybutadiene, and hydrogenated polyisoprene; and polyesters, such as poly(ethylene terephthalate), poly(butylene terephthalate), and polycaprolactone. These polymers are used in various applications depending on the main chain structures and the manner for crosslinking.

A vinyl polymer has a main chain including a carbon-carbon bond only and exhibits high weathering resistance. If an alkenyl group is incorporated into ends of a vinyl polymer chain, a curable composition having superior physical properties can be prepared compared to a polymer having alkenyl groups in the side chain. Although production methods therefor have been studied by many researchers, industrial production methods which are simple and easy have not yet been found.

Japanese Unexamined Patent Application Publication No. 5-255415 discloses a method for synthesizing a vinyl polymer having alkenyl groups at both ends using a disulfide having alkenyl groups as a chain transfer agent. Japanese Unexamined Patent Application Publication No. 5-262808 discloses a synthetic method in which a vinyl polymer having hydroxyl groups at both ends is produced with a disulfide having hydroxyl groups, and a vinyl polymer having alkenyl groups at both ends is produced by the reaction of the hydroxyl groups. However, in these methods, it is difficult to introduce alkenyl groups into both ends reliably, and it is not possible to prepare curable compositions having satisfactory characteristics. In order to introduce alkenyl groups into both ends reliably, a chain transfer agent must be used in large quantity, resulting in problems in the production process and cost.

In order to overcome the problems described above, methods are disclosed, such as a method in which alkenyl groups are incorporated into ends of a polymer using an organometallic compound (Japanese Unexamined Patent Application Publication No. 9-272714), and a method in which atom transfer radical polymerization is performed using an organohalide or the like as an initiator and a transition metal complex as a catalyst, and alkenyl groups are introduced by the terminal halogen atom (Japanese Unexamined Patent Application Publication No. 2000-128924). However, in these methods, since a large amount of metal compound is used, the resultant polymer may be colored, or the production process is complicated because of additional purification steps. In some cases, because the metal complexes inhibit hydrosilylation, a large amount of hydrosilylation catalyst is required.

On the other hand, reversible addition-fragmentation chain transfer polymerization (RAFT polymerization) is an excellent technique for producing a vinyl copolymer because the molecular weight and the molecular-weight distribution can be controlled and the technique can be applied to a wide variety of monomers and polymerization methods. The details of the technique including its reaction mechanism are described in PCT Publication Nos. WO98/01478, WO99/05099, and WO99/31144, and Macromolecules 1998, 31, 5559–5562. However, these documents neither disclose a method for introducing alkenyl groups into ends nor describe a curable composition. The present invention relates to a method for introducing alkenyl groups into ends by a RAFT polymerization technique, and a curable composition containing a vinyl polymer, as an essential component, having alkenyl groups produced by the RAFT polymerization technique.

DISCLOSURE OF INVENTION

It is an object of the present invention to provide a process for readily producing an alkenyl-terminated vinyl polymer without using a metal compound requiring a complicated purification step. It is another object of the present invention to provide a curable composition containing the vinyl polymer.

The present inventors have conducted intensive research to achieve the present invention. That is, the present invention relates to a process for producing an alkenyl-terminated vinyl polymer, the vinyl polymer, and a curable composition containing the vinyl polymer as an essential component.

The present invention will be described in detail below. It is to be understood that the present invention is not limited to the following description.

In one aspect of the present invention, a process for producing an alkenyl-terminated vinyl polymer includes introducing an alkenyl group represented by general formula (3):

(wherein $R^3$ is a hydrogen atom or hydrocarbon group of 1 to 20 carbon atoms that may contain an ether bond or ester bond), into a vinyl polymer having a thiocarbonylthio structure selected from the group consisting of a vinyl polymer represented by general formula (1):

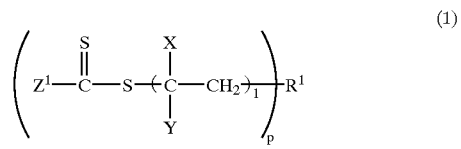

(1)

(wherein $R^1$ is a polyvalent organic group (p>1) which may contain a nitrogen atom, oxygen atom, sulfur atom, halogen atom, silicon atom, phosphorus atom, and metal atom, and may be a polymer, or $R^1$ may be a hydrogen atom or halogen atom for p=1; $Z^1$ is a hydrogen atom, halogen atom, or monovalent organic group which may contain a nitrogen atom, oxygen atom, sulfur atom, halogen atom, silicon atom, and phosphorus atom, and may be a polymer; X is a hydrogen atom, halogen atom, or monovalent organic group which may contain a nitrogen atom, oxygen atom, sulfur atom, halogen atom, and silicon atom; Y is a hydrogen atom, halogen atom, or monovalent organic group which may contain a nitrogen atom, oxygen atom, sulfur atom, halogen atom, and silicon atom; p is an integer of 1 or more; l is an integer of 5 or more; and when plural X's, Y's, and $Z^1$'s are present, the plural X's, Y's, and $Z^1$'s may be each the same or different), and a vinyl polymer represented by general formula (2):

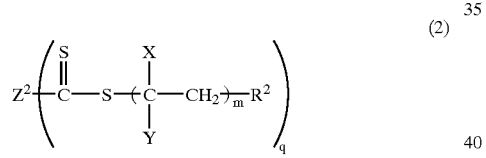

(2)

(wherein $R^2$ is a hydrogen atom, halogen atom, or monovalent organic group which may contain a nitrogen atom, oxygen atom, sulfur atom, halogen atom, silicon atom, phosphorus atom, and metal atom, and may be a polymer; $Z^2$ is a sulfur atom (when q=2), oxygen atom (when q=2), nitrogen atom (when q=3), or polyvalent organic group which may contain a nitrogen atom, oxygen atom, sulfur atom, halogen atom, silicon atom, and phosphorus atom, and may be a polymer; X is a hydrogen atom, halogen atom, or monovalent organic group which may contain a nitrogen atom, oxygen atom, sulfur atom, halogen atom, and silicon atom; Y is a hydrogen atom, halogen atom, or monovalent organic group which may contain a nitrogen atom, oxygen atom, sulfur atom, halogen atom, and silicon atom; q is an integer of 2 or more; m is an integer of 5 or more; and plural X's, Y's, and $R^2$'s may be each the same or different).

Because of ease of production of a telechelic polymer having alkenyl groups at both ends, preferably, the vinyl polymer having the thiocarbonylthio structure used in the present invention is a polymer represented by general formula (4):

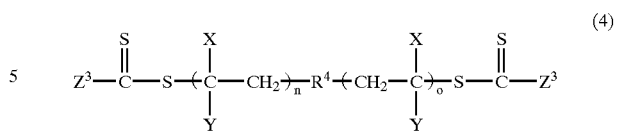

(4)

(wherein $R^4$ is a divalent organic group which may contain a nitrogen atom, oxygen atom, sulfur atom, halogen atom, silicon atom, phosphorus atom, and metal atom, and may be a polymer; each $Z^3$ is a hydrogen atom, halogen atom, or monovalent organic group which may contain a nitrogen atom, oxygen atom, sulfur atom, halogen atom, silicon atom, and phosphorus atom, and may be a polymer; each X is a hydrogen atom, halogen atom, or monovalent organic group which may contain a nitrogen atom, oxygen atom, sulfur atom, halogen atom, and silicon atom; each Y is a hydrogen atom, halogen atom, or monovalent organic group which may contain a nitrogen atom, oxygen atom, sulfur atom, halogen atom, and silicon atom; n and o are each an integer of 5 or more; and plural X's and Y's may be the same or different).

The vinyl polymer having the thiocarbonylthio structure used in the present invention may be prepared by polymerizing a vinyl monomer using a known method. Because of ease of introduction of the thiocarbonylthio structure and ease of control of the molecular weight and the molecular-weight distribution, preferably, the vinyl polymer having the thiocarbonylthio structure used in the present invention is prepared by polymerizing a vinyl monomer represented by general formula (7):

(7)

(wherein X is a hydrogen atom, halogen atom, or monovalent organic group which may contain a nitrogen atom, oxygen atom, sulfur atom, halogen atom, and silicon atom; Y is a hydrogen atom, halogen atom, or monovalent organic group which may contain a nitrogen atom, oxygen atom, sulfur atom, halogen atom, and silicon atom), in the presence of a compound having a thiocarbonylthio structure selected from the group consisting of a compound represented by general formula (5):

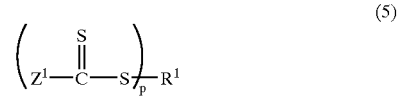

(5)

(wherein $R^1$ is a polyvalent organic group (p>1) of 1 or more carbon atoms which may contain a nitrogen atom, oxygen atom, sulfur atom, halogen atom, silicon atom, phosphorus atom, and metal atom, and may be a polymer; $Z^1$ is a hydrogen atom, halogen atom, or monovalent organic group (p=1) of 1 or more carbon atoms which may contain a nitrogen atom, oxygen atom, sulfur atom, halogen atom, silicon atom, and phosphorus atom, and may be a polymer; p is an integer of 1 or more; and when plural X's are present, the plural X's may be each the same or different), and a compound represented by general formula (6):

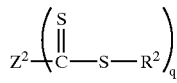
(6)

(wherein $R^2$ is a monovalent organic group of 1 or more carbon atoms which may contain a nitrogen atom, oxygen atom, sulfur atom, halogen atom, silicon atom, phosphorus atom, and metal atom, and may be a polymer; $Z^2$ is a sulfur atom (when q=2), oxygen atom (when q=2), nitrogen atom (when q=3), or polyvalent organic group of 1 or more carbon atoms which may contain a nitrogen atom, oxygen atom, sulfur atom, halogen atom, silicon atom, and phosphorus atom, and may be a polymer; q is an integer of 2 or more; and plural $R^2$'s may be the same or different).

In the vinyl polymer having the thiocarbonylthio structure represented by general formula (1) and the compound represented by general formula (5) which are used in the present invention, $R^1$ is not particularly limited. In terms of availability, $R^1$ is preferably benzyl, 1-phenylethyl, 2-phenyl-2-propyl, 1-acetoxyethyl, 1-(4-methoxyphenyl)ethyl, ethoxycarbonylmethyl, 2-ethoxycarbonyl-2-propyl, 2-cyano-2-propyl, tert-butyl, 1,1,3,3-tetramethylbutyl, 2-(4-chlorophenyl)-2-propyl, vinylbenzyl, tert-butylthio, 2-carboxylethyl, carboxylmethyl, cyanomethyl, 1-cyanoethyl, 2-cyano-2-butyl, or any one of organic substituent groups represented by general formulae (8):

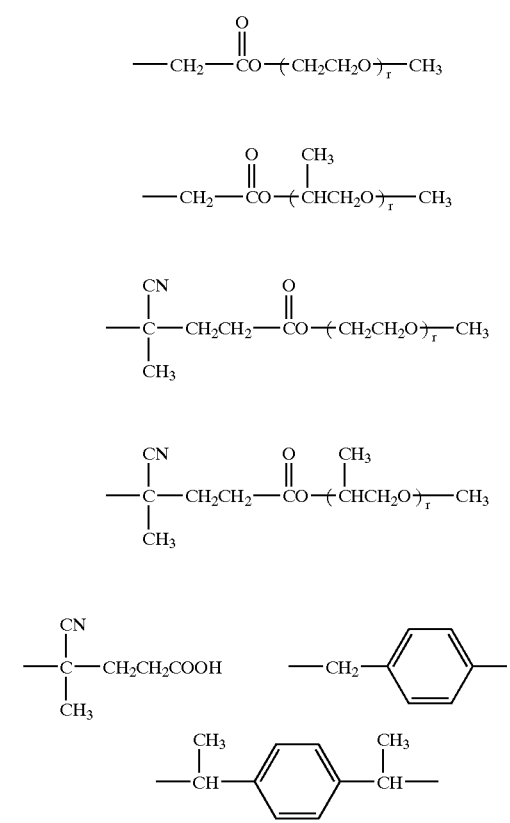
(8)

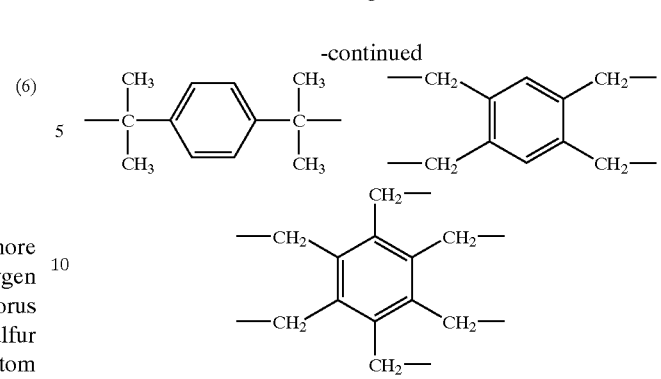

(wherein r is an integer of 1 or more).

In the vinyl polymer having the thiocarbonylthio structure represented by general formula (2) and the compound represented by general formula (6) which are used in the present invention, $R^2$ is not particularly limited. In terms of availability, $R^2$ is preferably benzyl, 1-phenylethyl, 2-phenyl-2-propyl, 1-acetoxyethyl, 1-(4-methoxyphenyl)ethyl, ethoxycarbonylmethyl, 2-ethoxycarbonyl-2-propyl, 2-cyano-2-propyl, tert-butyl, 1,1,3,3-tetramethylbutyl, 2-(4-chlorophenyl)-2-propyl, vinylbenzyl, tert-butylthio, 2-carboxylethyl, carboxylmethyl, cyanomethyl, 1-cyanoethyl, 2-cyano-2-butyl, or any one of organic substituent groups represented by general formulae (9):

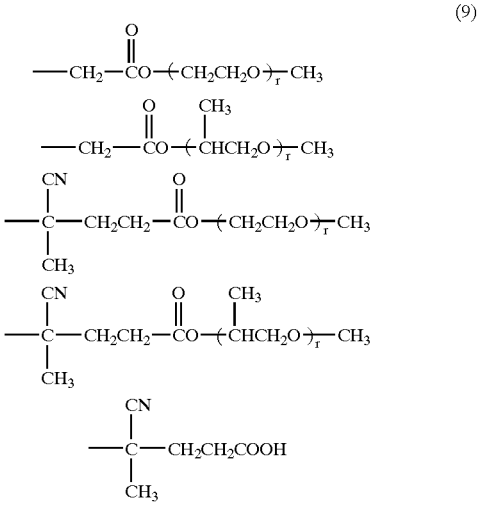
(9)

(wherein r is an integer of 1 or more).

In the vinyl polymer having the thiocarbonylthio structure represented by general formula (1) and the compound represented by general formula (5) which are used in the present invention, $Z^1$ is not particularly limited. In terms of availability, $Z^1$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, methylthio, phenoxy, phenylthio, N,N-dimethylamino, N,N-diethylamino, N-phenyl-N-methylamino, N-phenyl-N-ethylamino, benzylthio, pentafluorophenoxy, or any one of organic substituent groups represented by general formulae (10) below.

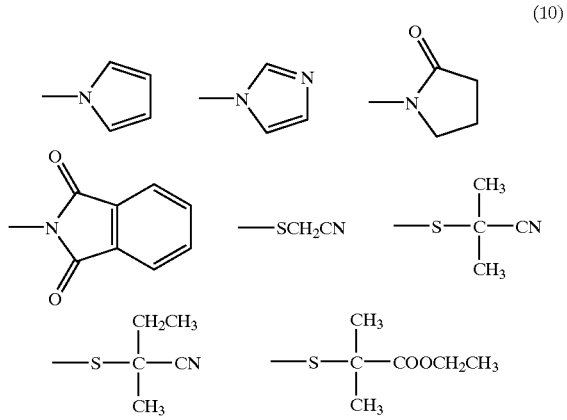

(10)

In the vinyl polymer having the thiocarbonylthio structure represented by general formula (2) and the compound represented by general formula (6) which are used in the present invention, $Z^2$ is not particularly limited. In terms of availability, $Z^2$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, thiomethyl (methylsulfide), phenoxy, thiophenyl (phenylsulfide), N,N-dimethylamino, N,N-diethylamino, N-phenyl-N-methylamino, N-phenyl-N-ethylamino, thiobenzyl (benzylsulfide), pentafluorophenoxy, or any one of organic substituent groups represented by general formulae (11) below.

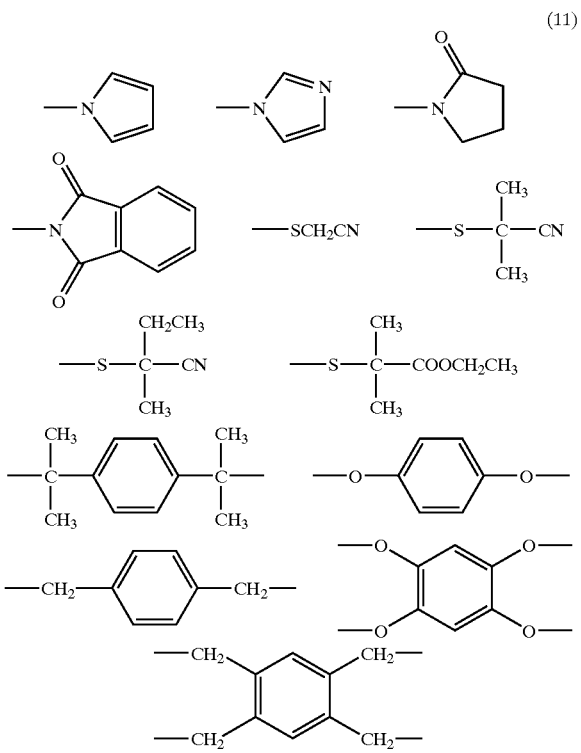

(11)

In the vinyl polymer having the thiocarbonylthio structure represented by general formula (4) which is used in the present invention, $R^4$ is not particularly limited. In terms of availability, $R^4$ is preferably any one of groups represented by general formulae (12) below.

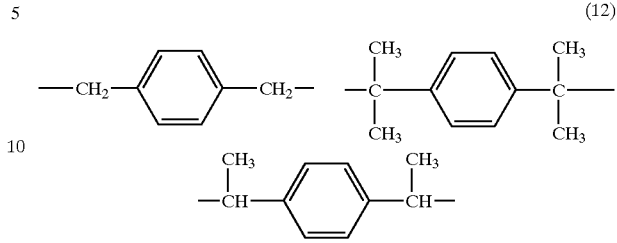

(12)

In the vinyl polymer having the thiocarbonylthio structure represented by general formula (4) which is used in the present invention, $Z^3$ is not particularly limited. In terms of availability, $Z^3$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, thiomethyl (methylsulfide), phenoxy, thiophenyl (phenylsulfide), N,N-dimethylamino, N,N-diethylamino, N-phenyl-N-methylamino, N-phenyl-N-ethylamino, thiobenzyl (benzylsulfide), pentafluorophenoxy, or any one of organic substituent groups represented by general formulae (10) below.

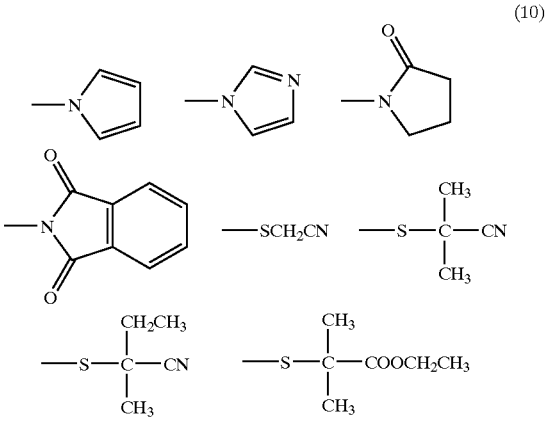

(10)

In the vinyl polymer having the thiocarbonylthio structure used in the present invention, the moiety represented by general formula (13) below is not particularly limited.

(13)

For example, the moiety may be obtained by polymerization of a vinyl monomer. Examples of vinyl monomers which may be used include, but not limited to, styrene compounds, such as styrene, α-methylstyrene, divinylbenzene, p-hydroxystyrene, p-carboxystyrene, p-methoxystyrene, diethylaminostyrene, diethylamino α-methylstyrene, p-vinylbenzenesulfonic acid, sodium p-vinylbenzenesulfonate, and m,m-dimethylstyrene; olefin-terminated aliphatic compounds, such as ethylene, propylene, 1-butene, 1-heptene, 1-hexene, 1-octene, isobutylene, butadiene, and isoprene;

halogen-containing olefin compounds, such as vinyl chloride, vinyl fluoride, vinyl bromide, chloroprene, and vinylidene chloride; acrylic acid and methacrylic acid; acrylic esters, such as methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, acrylate of alkyl-modified dipentaerythritol, ethylene oxide-modified bisphenol A diacrylate, Carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraetylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonandiol acrylate, 1,4-butanediol acrylate, 2-propanoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, and allyl acrylate; methacrylic esters, such as methyl methacrylate, ethyl methacrylate, n-butyl methacrylate, isobutyl methacrylate, tert-butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, N,N-dimethylaminoethyl methacrylate, N,N-diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, 2-ethylhexyl methacrylate, nonyl methacrylate, decyl methacrylate, dodecyl methacrylate, phenyl methacrylate, tolyl methacrylate, isobornyl methacrylate, 2-methoxyethyl methacrylate, 3-methoxybutyl methacrylate, 2-aminoethyl methacrylate, triethylene glycol methacrylate, 2-methacryloyloxypropyltrimethoxysilane, 2-methacryloyloxypropyldimethoxymethylsilane, trifluoromethyl methacrylate, pentafluoroethyl methacrylate, and 2,2,2-trifluoroethyl methacrylate; nitrogen-containing olefin compounds, such as acrylamide, methacrylamide, N-methylacrylamide, N-methylmethacrylamide, N,N-dimethylacrylamide, N,N-dimethylmethacrylamide, N-tert-butylacrylamide, N-tert-butylmethacrylamide, N-n-butylacrylamide, N-n-butylmethacrylamide, N-methylolacrylamide, N-methylolmethacrylamide, N-ethylolacrylamide, N-ethylolmethacrylamide, acrylonitrile, methacrylonitrile, N-phenylmaleimide, N-butylmaleimide, 4-vinylpyridine, N-vinylpyrrolidone, and N-vinylcarbazole; carboxyl-containing unsaturated compounds, such as p-vinylbenzoic acid, vinyl benzoate, itaconic acid, itaconic anhydride, α-methylvinylbenzoic acid, vinyl acetate, vinyl butanoate, vinyl ethyl carbonate, vinyl allyl carbonate, divinyl carbonate, diallyl carbonate, maleic anhydride, allyl acetate, and allyl benzoate; unsaturated group-containing ether compounds, such as vinyl ethyl ether, vinyl phenyl ether, divinyl ether, allyl ethyl ether, allyl phenyl ether, and diallyl ether; cyclopolymerizable compounds having a 1,6-heptadiene structure, such as diallylammonium chloride, 1,6-heptadiene, 2,6-dicyano-1,6-heptadiene, and 2,4,4,6-tetrakis (ethoxycarbonyl)-1,6-heptadiene; silicon-containing unsaturated compounds, such as dimethylvinyl silane, trimethylvinyl silane, dimethylphenylvinyl silane, dimethoxymethylvinyl silane, diethoxyphenylvinyl silane, trimethoxyvinyl silane, pentamethylvinyldisiloxane, trimethylallyl silane, trimethoxyallyl silane, dimethoxymethylallyl silane, heptamethylvinylcyclotetrasiloxane, and 1,1,3,3-tetramethyldivinyldisiloxane; unsaturated group-containing macromonomers, such as allyl-terminated poly(ethylene oxide), allyl-terminated poly(propylene oxide), allyl-terminated poly(ethylene oxide)-poly(propylene oxide) copolymers, vinyl-terminated poly(ethylene oxide), vinyl-terminated poly(propylene oxide), vinyl-terminated poly (ethylene oxide)-poly(propylene oxide) copolymers, methallyl-terminated poly(propylene oxide), vinyl-terminated poly(tetramethylene oxide), acryloyl-terminated poly (acrylic acid), methacryloyl-terminated poly(methacrylic acid), acryloyl-terminated poly(acrylate esters), acryloyl-terminated poly(methacrylate esters), methacryloyl-terminated acrylate esters, methacryloyl-terminated methacrylate esters, vinyl-terminated polysiloxane, vinyl-terminated polycarbonate, allyl-terminated polycarbonate, vinyl-terminated poly(ethylene terephthalate), vinyl-terminated poly (butylene terephthalate), vinyl-terminated caprolactam, vinyl-terminated polyamides, and vinyl-terminated polyurethane. The vinyl monomer used in the present invention may be used alone or in combination. Among these vinyl monomers, because of their availability and usefulness of the resultant polymers, preferred are styrene, α-methylsyrene, butadiene, isoprene, chloroprene, ethylene, propylene, vinyl chloride, vinyl fluoride, vinyl bromide, vinylidene chloride, acrylic acid, methacrylic acid, acrylate esters, methacrylate esters, acrylamide, methacrylamide, acrylonitrile, methacrylonitrile, vinyl acetate, vinyl butanoate, vinyl benzoate, maleic anhydride, maleimide compounds, N-vinylpyrrolidone, N-vinylcarbazole, fumarate esters, 1,6-heptadiene compounds, and diallylammonium salts. More preferred are styrene, butadiene, isoprene, chloroprene, vinyl chloride, vinylidene chloride, acrylic acid, methacrylic acid, acrylate esters, methacrylate esters, acrylamide, methacrylamide, acrylonitrile, and vinyl acetate. A homopolymer may be produced from any one of these monomers or a copolymer may be produced from a plurality of monomers. In the case of the copolymer, any known form may be acceptable, such as a random copolymer, block copolymer, or graft copolymer. When copolymers are produced, combinations of monomers are not particularly limited. In terms of industrial usefulness, preferred combinations are styrene/butadiene, styrene/butadiene/acrylonitrile, styrene/isoprene, styrene/acrylate ester, styrene/methacrylate ester, styrene/acrylonitrile, styrene/vinyl chloride, vinyl chloride/acrylonitrile, vinyl chloride/acrylate ester, vinyl chloride/methacrylate ester, vinyl chloride/vinyl acetate, vinyl chloride/vinyl acetate/acrylonitrile, vinyl chloride/vinyl acetate/methacrylate ester, vinyl chloride/vinylidene chloride, vinyl chloride/vinylidene chloride/acrylonitrile, acrylic acid/acrylate ester, acrylic acid/methacrylate ester, acrylic acid/acrylate ester/methacrylate ester, methacrylic acid/acrylate ester, methacrylic acid/methacrylate ester, methacrylic acid/acrylate ester/methacrylate ester, acrylate ester/methacrylate ester, combinations of different types of acrylate esters, combinations of different types of methacrylate esters, acrylate ester/acrylonitrile, methacrylate ester/acrylonitrile, acrylate ester/methacrylate ester/acrylonitrile, acrylate ester/vinyl acetate, methacrylate ester/vinyl acetate, acrylate ester/methacrylate ester/vinyl acetate, and acrylonitrile/vinyl acetate.

Because of ease of production of a telechelic polymer having alkenyl groups at both ends, preferably, the vinyl polymer having the thiocarbonylthio structure used in the present invention is a compound having thiocarbonylthio structures at both ends represented by general formula (14):

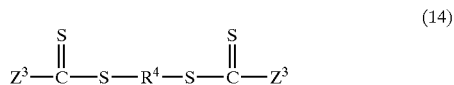

(14)

(wherein $R^4$ is a divalent organic group which may contain a nitrogen atom, oxygen atom, sulfur atom, halogen atom, silicon atom, phosphorus atom, and metal atom, and may be a polymer, each $Z^3$ is a hydrogen atom, halogen atom, or monovalent organic group which may contain a nitrogen atom, oxygen atom, sulfur atom, halogen atom, silicon atom, and phosphorus atom, and may be a polymer.

In the compound having the thiocarbonylthio structure represented by general formula (14), although $R^4$ and $Z^3$ are not particularly limited, $R^4$ and $Z^3$ are preferably the same as those described with reference to general formula (4).

Specific examples of compounds having the thiocarbonylthio structure described above includes, but not limited to, compounds represented by general formulae (15):

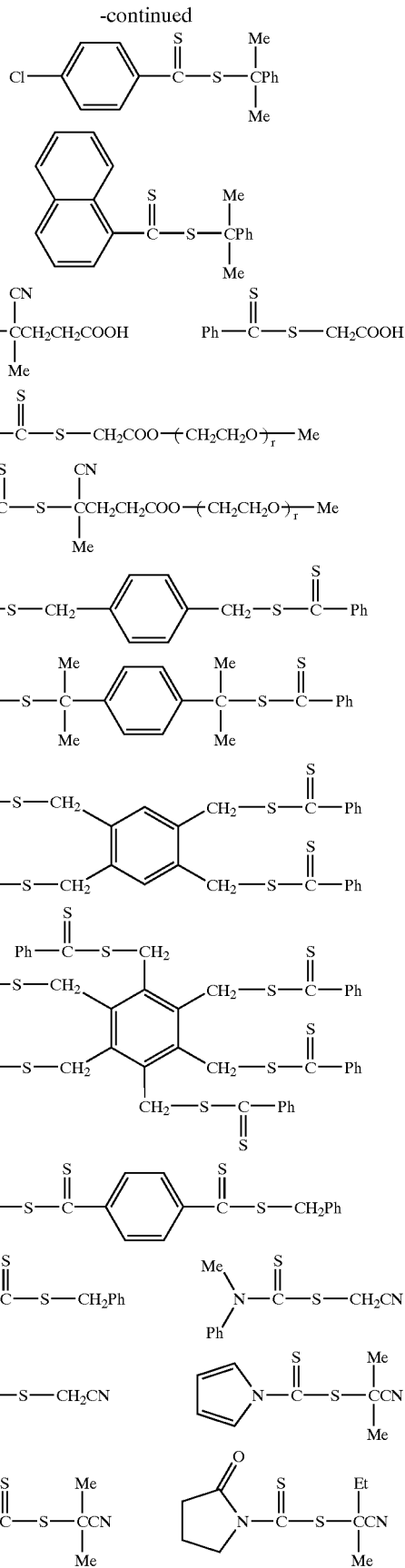

-continued

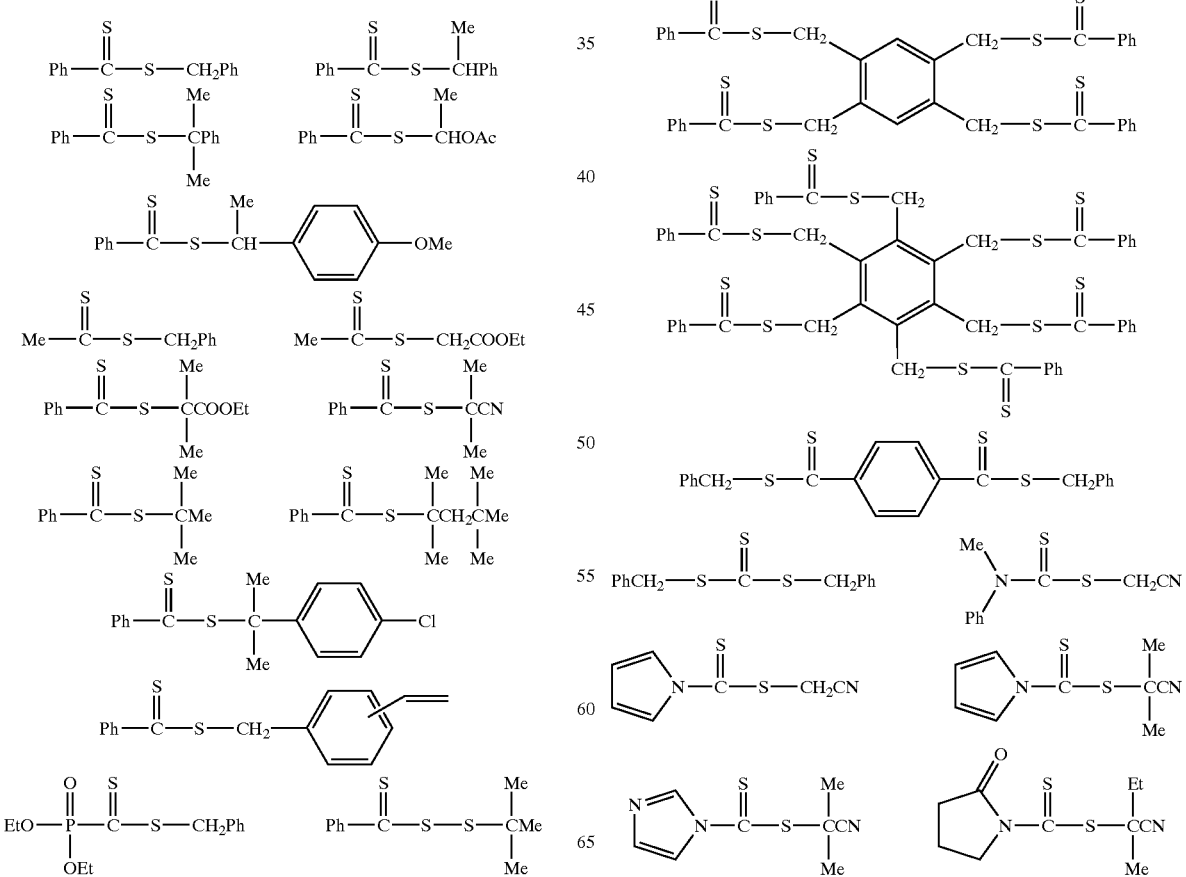

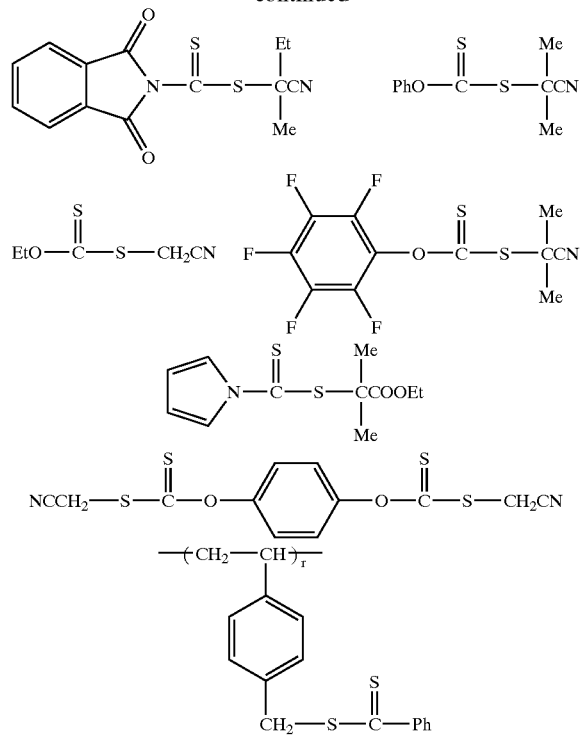

The above all formulae are general formulae (15).

(wherein Me, Et, and Ph represent methyl, ethyl, and phenyl, respectively, and r is an integer of 1 or more).

In the present invention, radical polymerization of the vinyl monomer in the presence of the compound having the thiocarbonylthio structure may not be limited to a particular method and may be performed by any known method, such as bulk polymerization, solution polymerization, emulsion polymerization, suspension polymerization, or microsuspension polymerization.

In the present invention, in the case of solution polymerization of the vinyl monomer, examples of solvents which may be used include, but not limited to, hydrocarbon solvents, such as heptane, hexane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; alcohol solvents, such as methanol, ethanol, isopropanol, n-butanol, sec-butanol, and isobutanol; ether solvents, such as tetrahydrofuran, diethyl ether, dibutyl ether, dioxane, ethylene glycol dimethyl ether, and ethylene glycol diethyl ether; and aromatic petroleum solvents, such as toluene, xylene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The types and amounts of solvent used may be determined in consideration of the solubility of the monomer used, the solubility of the resultant polymer, the polymerization initiator concentration and the monomer concentration suitable for achieving a satisfactory reaction rate, the solubility of the compound having the thiocarbonylthio structure, effects on human body and environment, availability, cost, etc., and are not particularly limited. Above all, toluene is preferred in view of availability and cost.

In the present invention, in the case of emulsion polymerization or microsuspension polymerization of the vinyl monomer, examples of emulsifiers which may be used include, but not limited to, anionic surfactants, such as fatty acid soap, rosin acid soap, sodium naphthalenesulfonate-formalin condensates, sodium alkylbenzene sulfonate, ammonium alkylsulfate, triethanolamine alkylsulfate, sodium dialkylsulfosuccinate, sodium alkyldiphenylether disulfonate, sodium polyoxyethylene alkyl ether sufonate, and sodium polyoxyethylene alkylphenyl ether sulfonate; nonionic surfactants, such as polyoxyethylene alkyl ether, polyoxyethylene higher alcohol ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene aklylamine, and alkyl alkanolamide; and cationic surfactants, such as alkyltrimethylammonium chloride. These emulsifiers may be used alone or in combination. A cationic surfactant, such as alkylamine hydrochloride, may be used as necessary, and a dispersant for suspension polymerization which will be described below may also be added. The amount of the emulsifier used is usually 0.1 to 20 parts by weight based on 100 parts by weight of the monomer, but not limited thereto.

In the present invention, in the case of suspension polymerization of the vinyl monomer, a known dispersant may be used. Examples of dispersants include, but not limited to, partially saponified poly(vinyl acetate), poly(vinyl alcohol), methyl cellulose, carboxymethyl cellulose, gelatin, poly (alkylene oxide), and combinations of anionic surfactants and dispersing agents. These may be used alone or in combination. The emulsifier for emulsion polymerization may also be used as necessary. The amount of the dispersant used is usually 0.1 to 20 parts by weight based on 100 parts by weight of monomer, but not limited thereto.

In the present invention, the polymerization initiator or polymerization initiation method used in the radical polymerization of the vinyl monomer in the presence of the compound having the thiocarbonylthio structure are not particularly limited, and any known polymerization initiator or polymerization initiation method may be used. Examples of polymerization initiators include, but not limited to, peroxide polymerization initiators, such as cyclohexanone peroxide, 3,3,5-trimethyl cyclohexanone peroxide, methyl cyclohexanone peroxide, 1,1-bis(tert-butylperoxy)-3,3,5-trimethyl cyclohexane, 1,1-bis(tert-butylperoxy)cyclohexane, n-butyl-4,4-bis(tert-butylperoxy)valerate, cumene hydroperoxide, 2,5-dimethylhexane-2,5-dihydroperoxide, 1,3-bis(tert-butylperoxy)-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl)peroxycarbonate, tert-butylperoxybenzoate, and 2,5-dimethyl-2,5-di(benzoylperoxy)hexane; azo polymerization initiators, such as 2,2'-azobis(isobutyronitrile), 1,1-azobis(cyclohexane-1-carbonitrile), azocumene, 2,2'-azobis(2-methylbutyronitrile), 2,2'-azobisdimethylvaleronitrile, 4,4'-azobis(4-cyanovaleric acid), 2-(tert-butylazo)-2-cyanopropane, 2,2'-azobis(2,4,4-trimethylpentane), 2,2'-azobis(2-methylpropane), and dimethyl 2,2'-azobis(2-methylpropionate); inorganic peroxides, such as potassium persulfate and sodium persulfate; monomers which thermally generate radical species, such as styrene; compounds which generate radical species by light, such as benzoine derivatives, benzophenone, acylphosphine oxide, and photo-redox systems; and redox polymerization initiators including sodium sulfite, sodium thiosulfate, sodium formaldehyde sulfoxylate, ascorbic acid, ferrous sulfate, or the like, as a reducing agent, and potassium peroxydisulfate, hydrogen peroxide, tert-butyl hydroperoxide, or the like, as an oxidizing agent. These polymerization initiators may be used alone or in combination. It may also be possible to use a polymerization initiation system of electron irradiation, X-ray irradiation, radiation irradiation, or the like. With respect to polymerization initiation methods, the methods described in Moad and Solomon "The Chemistry of Free Radical Polymerization", Pergamon, London, 1995, pp. 53–95 may be employed. In the present invention, the amount of polymerization initiator used is not particularly limited. In order to produce a polymer with a narrow molecular-weight distribution, the amount of radical species generated during polymerization is preferably 1 equivalent or less, and more preferably 0.5 equivalents or less, of the compound having the thiocarbonylthio structure. In order to control the amount of radical species generated during polymerization, in addition to the control of the amount of the polymerization initiator, preferably, temperature is controlled in the case of the polymerization initiator which causes thermal dissociation, or the amount of energy is controlled in the case of the polymerization initiation system which generates radicals by light or electron beams.

In the present invention, as the method for introducing the alkenyl groups to the ends of the vinyl polymer, when the vinyl monomer is radical-polymerized in the presence of the compound having the thiocarbonylthio structure, preferably, a diene compound containing at least one alkenyl group represented by general formula (3):

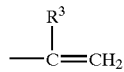

(3)

(wherein $R^3$ is a hydrogen atom or hydrocarbon group of 1 to 20 carbon atoms that may contain an ether bond or ester bond), and at least one radical-polymerizable unsaturated group in its molecule is copolymerized at the stage in which the rate of consumption or the rate of conversion of the vinyl monomer is 80% or more.

In the method of the present invention described above, examples of diene compounds which may be used include, but not limited to, butadiene, isoprene, chloroprene, 1,4-pentadiene, 1,5-hexadiene, 1,6-heptadiene, 1,7-octadiene, 1,9-decadiene, 1,2-divinylcyclohexane, 1-allyl-4-vinylcyclohexane, 1,4-diallylcyclohexane, 1,4-divinylbenzene, 1,2-divinylbenzene, 4-vinyl-α-methylstyrene, 4-allylstyrene, 4-allyl-α-methylstyrene, 1,4-diallylbenzene, 1,3,5-trivinylbenzene, 1,4-divinylnaphthalene, 9,10-divinylanthracene, divinyl ether, diallyl ether, allyl vinyl ether, divinyl carbonate, diallyl carbonate, bisphenol A diallyl ether, bisphenol A divinyl ether, trimethylolpropanetriallyl ether, trimethylolpropane trivinyl ether, trimethylolpropane monovinyldiallyl ether, triallyl isocyanurate, dimethoxydivinylsilane, dimethyldivinylsilane, 1,5-divinylhexamethylcyclotetrasiloxane, vinyl methacrylate, isopropenyl methacrylate, allyl methacrylate, 4-vinylphenyl methacrylate, bisphenol A dimethacrylate, dimethacrylate of caprolactone-modified neopentyl glycol hydroxypivalate, ditrimethylolpropane tetramethacrylate, dipentaerythritol hexamethacrylate, dipentaerythritol pentamethacrylate, triethylolpropane ethoxy trimethacrylate, trimethylolpropane trimethacrylate, trimethylolpropane dimethacrylate, neopentyl glycol dimethacrylate, dimethacrylate of neopentyl glycol hydroxypivalate, 1,9-nonandiol dimethacrylate, 1,4-butanediol dimethacrylate, 1,6-hexanediol dimethacrylate, ethylene glycol dimethacrylate, triethylene glycol dimethacrylate, tetraethylene glycol dimethacrylate, pentaerythritol trimethacrylate, N-vinylaminoethyl methacrylate, N-allylaminoethyl methacrylate, N,N-divinylaminoethyl methacrylate, N,N-diallylaminoethyl methacrylate, vinyl acrylate, isopropenyl acrylate, allyl acrylate, 4-biphenyl acrylate, bisphenol A diacrylate, diacrylate of caprolactone-modified neopentyl glycol hydroxypivalate, ditrimethylolpropane tetraacrylate, dipentaerythritol hexaacrylate, dipentaerythritol pentaacrylate, trimethylolpropane ethoxy triacrylate, trimethylolpropane triacrylate, trimethylolpropane diacrylate, neopentyl glycol diacrylate, diacrylate of neopentyl glycol hydroxypivalate, 1,9-nonandiol diacrylate, 1,4-butanediol diacrylate, 1,6-hexanediol diacrylate, ethylene glycol diacrylate, triethylene glycol diacrylate, tetraethylene glycol diacrylate, pentaerythritol triacrylate, N-vinylaminoethyl acrylate, N-allylaminoethyl acrylate, N,N-divinylaminoethyl acrylate, N,N-diallylaminoethyl acrylate, poly(ethylene oxide) diallyl ether, poly(propylene oxide) diallyl ether, poly(ethylene oxide) divinyl ether, poly(propylene oxide) divinyl ether, poly(ethylene oxide) diisopropenyl ether, poly(propylene oxide) diisopropenyl ether, polycarbonate divinyl ether, polycarbonate diallyl ether, poly(butylene terephthalate) divinyl ether, poly(butylene terephthalate) diallyl ether, poly(ethylene terephtharate) divinyl ether, and poly(ethylene terephthalate) diallyl ether. These diene compounds may be used alone or in combination. Among these diene compounds, preferred is a compound in which a plurality of unsaturated bonds present in one molecule have different radical polymerization reactivities. Consequently, polymers are not easily crosslinked with each other. More preferred is a compound having at least two different unsaturated groups selected from the group consisting of vinyl, isopropenyl, allyl, methacryloyl, and acryloyl. When the diene compound is copolymerized, preferably, the diene compound is added at the stage in which the rate of consumption (conversion) of the vinyl monomer is 95% or more because the alkenyl groups can be introduced to the ends of the vinyl polymer in a more controlled manner.

In the present invention, in another preferred process for producing an alkenyl-terminated vinyl polymer, the thiocarbonylthio group of the vinyl polymer having the thiocarbonylthio structure is converted into a mercapto group or a mercaptide group, and the mercapto group or the mercaptide group is allowed to react with an alkenyl-containing compound.

In order to convert the thiocarbonylthio group of the vinyl polymer having the thiocarbonylthio structure into a mercapto group or a mercaptide group, a method may be employed in which the vinyl polymer having the thiocarbonylthio structure is treated with a base, an acid, ammonia, hydrazine, or an amine compound. The base, acid, or amine compound used for that purpose is not particularly limited. Examples of bases which may be used in the present invention include, but not limited to, alkali metals, such as lithium, potassium, and sodium; alkaline-earth metals, such as magnesium and calcium; alkali metal hydroxides, such as sodium hydroxide, potassium hydroxide, and lithium hydroxide; alkaline-earth metal hydroxides, such as calcium hydroxide, magnesium hydroxide, and barium hydroxide; typical metal hydroxides, such as aluminum hydroxide and zinc hydroxide; alkali metal alcoholates, such as sodium methylate, sodium ethylate, sodium phenylate, lithium ethylate, and lithium butylate; metal hydrides, such as sodium hydride, lithium hydride, calcium hydride, lithium aluminum hydride, and aluminum borohydride; and organometallic compounds, such as hydrosulfite, n-butyl lithium, tert-butyl lithium, ethylmagnesium bromide, phenylmagnesium bromide, and phenylmagnesium chloride. These bases may be used alone or in combination. Examples of acids which may be used in the present invention include, but not limited to, inorganic acids, such as hydrochloric acid, nitric acid, sulfuric acid, phosphoric acid, hydrofluoric acid, hydrobromic acid, fluoroboric acid, chlorosulfonic acid, hydriodic acid, arsenic acid, and silicofluoric acid; and organic acids, such as p-toluenesulfonic acid, trifluoromethane sulfonic acid, acetic acid, trifluoroacetic acid, methylphosphoric acid, ethylphosphoric acid, n-propylphosphoric acid, isopropylphosphoric acid, n-butylphosphoric acid, laurylphosphoric acid, stearylphosphoric acid, 2-ethylhexylphosphoric acid, isodecylphosphoric acid, dimethyldithiophosphoric acid, diethyldithiophosphoric acid, diisopropyldithiophosphoric acid, and phenylphosphonic acid. These acids may be used alone or in combination. Examples of amine compounds which may be used in the present invention include, but not limited to, hydroxylamine sulfate, hydroxylamine, N-(2-aminoethyl)ethanolamine, N-methylethanolamine, 12-aminododecanoic acid, 3-amino-1-propanol, amine-modified acrylic polymers, allyamine, diallylamine, isopropylamine, diisopropylamine, 3,3'-iminobis(propylamine), ethylamine, diethylamine, triethylamine, 2-ethylhexylamine, 3-(2-ethylhexyloxy)propylamine, 3-ethoxypropylamine, diisobutylamine, 3-(diethylamino)propylamine, di-2-ethylhexylamine, 3-(dibutylamino)propylamine, tert-butylamine, sec-butylamine, n-butylamine, n-propylamine, isopropylamine, 3-(methylamino)propylamine, 3-(dimethylamino)propylamine, N-methyl-3,3'-iminobis(propylamine), 3-methoxypropylamine, isopropanolamine, N-isopropylacrylamide, iminodiacetic acid, 3,3'-iminodipropionitrile, monoethanolamine, diethanolamine, N-ethylethylenediamine, ethyleneimine, ethylenediamine, diethylenetriamine, triethylenetetramine, tetraethylenepentamine, pentaethylenehexamine, N-carboxy-4,4'-methylenebiscyclohexylamine, carbohydrazides, guanidine hydrochloride, guanidine nitrate, guanidine carbonate, guanidine phosphate, guanidine sulfamate, aminoguanidine hydrochloride, aminoguanidine bicarbonate, guanylthiourea, guanylurea phosphate, guanylurea sulfate, glycylglycine, 2-chloroethylamine, 1,4-diaminobutane, 1,2-diaminopropane, 1,3-diaminopropane, diaminomaleonitrile, cyclohexylamine, cyclopentylamine, dicyandiamide, dicyclohexylamine, N-(3-(dimethylamino)propyl)acrylamide, N-(3-(dimethylamino)propyl)methacrylamide, dimethylamineborane, dimethylhydrazine, N,N'-ethylenebis(stearoamide), amide oleate, amide stearate, N,N'-methylenebis(stearoamide), methylol stearoamide, 3,9-bis(3-aminopropyl)-2,4,8,10-tetraoxaspiro[5,5]undecane, CTU guanamine, thiocarbohydrazide, thiosemicarbazide, thiourea, dihydrazide dodecanedioate, trans-1,2-cyclohexanediamine, dihydrazide adipate, dihydrazide sebacate, dihydrazide isophthalate, thiourea dioxide, 2-hydroxyethylaminopropylamine, n-butylamine, isobutylamine, tert-butylamine, 2-bromoethylamine, hexamethylenediamine, 1,6-hexamethylenebis(N,N-dimethylsemicarbazide), n-hexylamine, polyethyleneimine, formamidine, formamidine acetate, formamide, methacrylamide, monomethylamine, dimethylamine, trimethylamine, N,N'-methylenebis(acrylamide), N-methylolacrylamide, monomethylhydrazine, 3-(lauryloxy)propylamine, acetanilide, acetoacet-o-anisidide, acetoacetanilide, acetoacet-m-xylidide, acetoacet-o-chloroanilide, acetoacet-2,5,-dimethoxyanilide, acetoacet-2,5-dimethoxy-4-chloroanilide, acetoacet-o-toluidide, acetoacet-p-toluidide, o-anisidine, p-anisidine, aniline, p-aminoacetanilide, p-aminobenzoic acid, ethyl p-aminobenzoate ester, 2-amino-4-chlorophenol, 2-aminothiazole, 2-aminothiophenol, 2-amino-5-nitrobenzonitrile, o-aminophenol, m-aminophenol, p-aminophenol, p-aminobenzaldehyde, 4-aminobenzonitrile, anthranilic acid, 3-isopropoxyaniline, N-ethylaniline, N-ethylene toluene sulfonamide, 2,4-xylidine, 3,4-xylidine, m-xylylenediamine, p-cresidine, dianisidine, 4,4'-diaminostilbene-2,2'-disulfonic acid, 1,4-diaminoanthraquinone, 4,4'-diamino-3,3'-diethyldiphenylmethane, 4,4'-diaminobenzanilide, N,N-diethylaniline, diaminodiphenyl ether, diaminonaphthalene, diaminoanthracene, diphenylamine, dibenzylamine, N,N-dimethylaniline, 3,3'-dimethyl-4,4'-diaminodiphenylmethane, sulfanilic acid, 1,1,1',1'-tetramethyl-4,4'-(methylenedi-p-penylene)disemicarbazide, tobias acid, 2,4,5-trichloroaniline, o-tolidine, o-toluidine, m-toluidine, p-toluidine, m-toluylenediamine, sodium naphthionate, o-nitroaniline, m-nitroaniline, p-nitroaniline, o-nitro-p-chloroaniline, m-nitro-p-toluidine, o-chloro-p-toluidine-m-sulfonic acid, p-hydroxyphenylacetamide, 7-anilino-4-hydroxy-2-naphthalenesulfonic acid, phenylhydrazine, o-phenylenediamine, m-phenylenediamine, p-phenylenediamine, p-phenetidine, phenethylamine, benzylamine, benzophenone hydrazine, mesidine, metanilic acid, N-methylaniline, 2-methyl-4-nitroaniline, 2-methyl-4-methoxydiphenylamine, 2-amino-5-methylbenzenesulfonic acid, leuco-1,4-diaminoanthraquinone, paramine, p-hydroxyphenylglycine, acetaldehyde ammonia, acetoguanamine, 3-amino-1,2,4-triazole, 2-aminopyridine, 3-aminopyridine, 4-aminopyridine, 1-(2-aminoethyl)piperazine, N-(3-aminopropyl)morpholine, 1-amino-4-methylpiperazine, isocyanuric acid, imidazole, 2-methylimidazole, 2-ethyl-4-methylimidazole, 2-phenylimidazole, 2-undecylimidazole, 2-heptadecylimidazole, 2-phenyl-4-methylimidazole, 1-aminoethyl-2-methylimidazole, 1-(cyanoethylaminoethyl)-2-methylimidazole, N-(2-(2-methyl-1-imidazolyl)ethyl)urea, 2,4-diamino-6-(2-methyl-1-imidazolylethyl)-1,3,5-triazine, 2,4-diamino-6-(2-undecyl-1-imidazolylethyl)-1,3,5-tiazine, 2,4-diamino-6-(2-ethyl-4-methyl-1-imidazolylethyl)-1,3,5-tiazine, 2-phenyl-4-methyl-5-hydroxymethylimidazole, 2-phenyl-4,5-bis(hydroxymethyl)imidazole, an adduct of 2-methylimidazole and isocyanuric acid, an adduct of 2-phenylimidazole and isocyanuric acid, an adduct of 2,4-diamino-6-(2-methyl-1-imidazolylethyl)-1,3,5-triazine and isocyanuric acid, 2-methyl-4-formylimidazole, 2-phenyl-4-formylimidazole, 4-formylimidazole, 2,4-dimethyl-5-formylimidazole, 2,4-diphenyl-5-formylimidazole, 4-methylimidazole, 4-methyl-5-(hydroxymethyl)imidazole, 2-amino-4,5-dicyanoimdazole, imidazole-4,5-dicarboxylic acid, 3-carbamoyl-2-pyrazine carboxylic acid, imide succinate, quinaldine, quinoline, 1,3-di(4-piperidyl)propane, 2-imidazolidinone, 5,5-dimethylhydantoin, 2,5-dimethylpiperazine, cis-2,6-dimethylpiperazine, 3,5-dimethylpyrazole, 2-methyl-4-pyrazolone, 5,5'-bi-1H-tetrazole, 5-phenyl-1H-tetrazole, 5-methyl-1H-tetrazole, 1,2,3,4-tetrahydroquinoline, bis(aminopropyl)piperazine, 1,3-bis(hydrazinocarboethyl)-5-isopropylhydantoin, hydantoin, (hydroxyethyl)piperazine, 2-pipecoline, 3-pipecoline, 4-pipecoline, 2-(1-piperazinyl)pyrimidine, piperazine, piperidine, pyrrolidine, pyrrole, phenylpyrazolidone, benzoguanamine, N-methylpiperazine, 2-methylpiperazine, 3-methyl-5-pyrazolone, 1-methylol-5,5-dimethylhydantoin, melamine, morpholine; and hindered amine light stabilizers (HALSs), such as bis(2,2,6,6,-tetramethyl-4-piperidyl)sebacate, Sanol LS-770 (manufactured by Sankyo), Adekasutabu LA-77 (manufactured by Asahi Denka), Sumisorb 577 (manufactured by Sumitomo Chemical), Biosorb 04 (manufactured by Kyodo Chemical), Chimassorb 944LD (manufactured by Ciba Specialty), Tinuvin 144 (manufactured by Ciba Specialty), Adekasutabu LA-52 (manufactured by Asahi Denka), Adekasutabu LA-57 (manufactured by Asahi Denka), Adekasutabu LA-67 (manufactured by Asahi Denka), Adekasutabu LA-68 (manufactured by Asahi Denka), Adekasutabu LA-77 (manufactured by Asahi Denka), Adekasutabu LA-87 (manufactured by Asahi Denka), and Goodrite UV-3034 (manufactured by Goodrich). These may be used alone or in combination. Additionally, a compound, such as calcium oxide, which produces the above compound, for example, by reaction with water, may also be used as a reagent for converting the thiocarbonylthio group into a mercapto group or a mercaptide group in the present invention.

As the reagent for converting the thiocarbonyl group of the polymer having the thiocarbonylthio structure into a mercapto group or a mercaptide group, preferred is a compound selected from the group consisting of bases, such as alkali metals, alkaline-earth metals, alkali metal hydroxides, alkaline-earth metal hydroxides, alkali metal hydrides, alkaline-earth metal hydrides, alkali metal oxides, alkaline-earth metal oxides, organometallic reagents containing alkali metals, and organometallic reagents containing alkaline-earth metals; ammonia; hydrazine; primary amines; and secondary amines, because of high conversion efficiency. More preferred are ammonia, hydrazine, primary amines, and secondary amines, because of ease of post-treatment and purification after conversion. Most preferred are ammonia; primary amines with a boiling point of 100° C. or less and secondary amines with a boiling point of 100° C. or less, such as monomethylamine, dimethylamine, monoethylamine, and diethylamine; and hindered amine light stabilizers (HALSs), in view of the fact that post-treatment and purification after conversion can be omitted or simplified. When ammonia, primary amines with a boiling point of 100° C. or less, and secondary amines with a boiling point of 100° C. or less are used, the excess of these compounds can be easily removed by distillation under reduced pressure. When HALSs are used, it is not necessary to remove them because resultant vinyl polymers have improved heat resistance, light resistance, and weathering resistance.

In the present invention, when a base or acid is used, the amount of the base or acid is not particularly limited. In view of handleability and reactivity, the amount of use is preferably 0.1 to 100 parts by weight, more preferably 0.2 to 50 parts by weight, and most preferably 0.5 to 30 parts by weight based on 100 parts by weight of the polymer. In the present invention, when ammonia, hydrazine, or an amine compound is used, the amount of use is not particularly limited. Because of a high introduction rate of the mercapto group, the amount of ammonia, hydrazine, or the amine compound is preferably 0.5 to 1,000 equivalents, and more preferably 1 to 500 equivalents, of the thiocarbonylthio structure.

In the present invention, when the vinyl polymer having the thiocarbonylthio structure is treated with the base, acid, ammonia, hydrazine, or amine compound, the reaction conditions are not particularly limited. The polymer may be dissolved in an organic solvent, and a base, an acid, ammonia, hydrazine, or an amine compound may be added thereto. A base, an acid, ammonia, hydrazine, or an amine compound may be added to a dispersion or emulsion (latex). Alternatively, a base, an acid, ammonia, hydrazine, or an amine compound may be directly added to the polymer itself. The treatment temperature is not particularly limited. In view of reactivity, the treatment temperature is preferably −50° C. to 200° C., more preferably −10° C. to 150° C., and most preferably 0° C. to 120° C.

In the present invention, when the mercapto group or mercaptide group at the end of the vinyl polymer is reacted with an alkenyl-containing compound, any compound having a functional group which can react with the mercapto group or mercaptide group to form a bond may be used as the alkenyl-containing compound. Examples of functional groups capable of reacting with the mercapto group or mercaptide group to form bonds include, but not limited to, a hydroxyl group, a carboxyl group, an alkoxycarbonyl group (ester bond), an amide group, an epoxy group, a glycidyl group, a mercapto group, a thionester bond, a thiolester bond, a dithioester bond, an isocyanato group, an isothiocyanato group, a carbonyl group, an aldehyde group, an aryloxy group, a quaternary ammonium ion, a sulfone bond, a halogen atom, a carbon-carbon double bond, and a carbon-carbon triple bond.

Examples of compounds having these functional groups and alkenyl groups include, but are not limited to, compounds having hydroxyl groups and alkenyl groups, such as allyl alcohol, 2-vinylphenol, 4-vinylphenol, 4-buten-1-ol, 3-methyl-1-buten-3-ol, 3-methyl-1-penten-3-ol, 3,6-dimethyl-4-octene-3,6-diol, 2,4,7,9-tetramethyl-5-decene-4,7-diol, 3,5-dimethyl-1-hexene-3-ol, 2,5-dimethyl-3-hexene-2,5-diol, N,N-diallylamino alcohol, N,N-diallylethanolamine, N-allylethanolamine, 2-allyl-1-hexanol, ethylene glycol monoallyl ether, trimethylol propane diallyl ether, trimethylol propane monoallyl ether, pentaerythritol monoallyl ether, pentaerythritol diallyl ether, pentaerythritol triallyl ether, polyethylene glycol monoallyl ether, polytetramethylene ether glycol monoallyl ether, polypropylene glycol monoallyl ether, 2-allylcyclohexanol, 3-allylcyclohexanol, 4-allylcyclohexanol, 2-allylphenol, 3-allylphenol, 4-allylphenol, 1,4-dihydroxy-5-allylnaphthalene, bisphenol A monoallyl ether, 1-allyl-2-naphtol, 4-allyl-I-naphtol, 4-allylcatechol, spiroglycol monoallyl ether, tris(2-hydroxyethyl)isocyanurate allyl ether, furfuryl alcohol, and 4-allylfurfuryl alcohol; compounds having carboxyl groups and alkenyl groups, such as acrylic acid, methacrylic acid, itaconic acid, undecylenic acid, monoallyl malonate, 2-allylbenzoic acid, 3-allylbenzoic acid, 4-allylbenzoic acid, 3-allylanthranilic acid, 4-allylanthranilic acid, 5-allylanthranilic acid, 5-allylisophthalic acid, 4-allylsalicylic acid, 2-allylterephthalic acid, 2-allythiobenzoic acid, 3-allylthiobenzoic acid, 4-allylthiobenzoic acid, monoallyl trimellitate, diallyl trimellitate, 2-allyl-1-naphthalenecarboxylic acid, 1-allyl-2-naphthalenecarboxylic acid, 6-hydroxy-I-allyl-2-naphthoic acid, vinyl acetic acid, 2-allylphenoxyacetic acid, 3-allylphenoxyacetic acid, 4-allylphenoxyacetic acid, 2-allyl-4-pyridinecarboxylic acid, 4-allyl-quinolin-2-carboxlic acid, and 2-allylnicotinic acid; compounds having oxycarbonyl groups and alkenyl groups, such as methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, lauryl acrylate, acrylate of alkyl-modified dipentaerythritol, ethylene oxide-modified bisphenol A diacrylate, Carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraetylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonandiol acrylate, 1,4-butanediol acrylate, 2-propanoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, allyl acrylate, methyl methacrylate, ethyl methacrylate, n-butyl methacrylate, isobutyl methacrylate, tert-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, N,N-dimethylaminoethyl methacrylate, N,N-diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, 2-ethylhexyl methacrylate, nonyl methacrylate, decyl methacrylate, dodecyl methacrylate, phenyl methacrylate, tolyl methacrylate, isobornyl methacrylate, 2-methoxyethyl methacrylate, 3-methoxybutyl methacrylate, 2-aminoethyl methacrylate, triethylene glycol methacrylate, 2-methacryloyloxypropyltrimethoxysilane, 2-methacryloyloxypropyldimethoxymethylsilane, trifluoromethyl methacrylate, pentafluoroethyl methacrylate, 2,2,2-trifluoroethyl methacrylate, ethylene glycol monoallyl ether acetate, diallyl carbonate, 2-(trimethylammonio)ethyl methacrylate chloride, propylene glycol monoallyl ether acetate, allyl vinyl acetate, methyl vinyl acetate, and itaconic acid anhydride; compounds having amide groups and alkenyl groups, such as acrylamide, methacrylamide, N-methylacrylamide, N-methylmethacrylamide, N,N-dimethylacrylamide, N,N-dimethylmethacrylamide, N-tertbutylacrylamide, N-tert-butylmethacrylamide, N-n-butylacrylamide, N-n-butylmethacrylamide, N-methylolacrylamide, N-methylolmethacrylamide, N-ethylolacrylamide, N-ethylolmethacrylamide, N-isopropylacrylamide, and triacrylformal; compounds having epoxy groups and alkenyl groups, such as 3-allyl-1,2-epoxycyclohexane; compounds having glycidyl groups and alkenyl groups, such as allyl glycidyl ether; compounds having mercapto groups and alkenyl groups, such as allyl mercaptan, 4-butenthiol, 4-mercaptostyrene, 2-allylthiophenol, 3-allylthiophenol, 4-allylthiophenol, 3-allylthiosalicylic acid, 4-allylthiosalicylic acid, 5-allylthiosalicylic acid, furfuryl mercaptan, and 4-allylfurfuryl mercaptan; compounds having thionester bonds and alkenyl groups; compounds having thiolester bonds and alkenyl groups, such as methyl 2-allylthiobenzoate, ethyl 3-allylthiobenzoate, and allyl 4-allylthiobenzoate; compounds having dithioester bonds and alkenyl groups, such as 4-allyldithiobenzoic acid, methyl 4-allyldithiobenzoate, ethyl 4-allyldithiobenzoate, 2,4-diallylimidazole-5-dithiocarboxylic acid, and methyl 2,4-diallylimidazole-5-dithiocarboxylate; compounds having isocyanate groups and alkenyl groups, such as 3-butenyl isocyanate, 5-hexenyl isocyanate, and 4-allylphenyl isocyanate; compound having isothiocyanate groups and alkenyl groups, such as 3-butenyl isothiocyanate and 5-hexenyl isothiocyanate; compounds having carbonyl groups and alkenyl groups, such as allyl acetoacetate, methyl allyl ketone, ethyl allyl ketone, diallyl ketone, 2-allyl cyclohexanone, 3-allyl cyclohexanone, 4-allyl cyclohexanone, 5-allyl-5-methylhydantoin, and N-allyl-2-pyrrolidone; compounds having aldehyde groups and alkenyl groups, such as acrolein, methacrolein, arylglyoxal, 2-allylbenzaldehyde, 3-allylbenzaldehyde, 4-allylbenzaldehyde, 5-allyl-3-aldehyde pyridine, 2-allyl-4-formylimidazole, 2,4-diallyl-5-formylimidazole, furfural, and 4-allylfurfural; compounds having aryloxy groups and alkenyl groups, such as ally phenyl ether; compounds having quaternary ammonium ions and alkenyl groups, such as diallyldimethylammonium chloride; compounds having sulfone bonds and alkenyl groups, such as allyl allylsulfonate; compounds having halogen atoms and alkenyl groups, such as allyl chloride, allyl bromide, allyl chlorocarbonate ester, diallyl chlorendate, chloroprene, methallyl chloride, vinyl chloride, 1-allyl-2-chlorobenzene, 1-allyl-3-chlorobenzene, 1-allyl-4-chlorobenzene, 2-bromo-3-butene, and 1-bromo-3-butene; compounds having carbon-carbon double bonds and alkenyl groups, such as 1,6-hexanediol diallyl ether, isoprene, divinylbenzene, 4-vinyl-α-methylstyrene, diallyl terephtharate, diallyl phthalate, diallyl isophthalate, triallyl isocyanurate, triallyl cyanurate, and trimethallyl isocyanurate; and compounds having carbon-carbon triple bonds and alkenyl groups, such as 3-buten-1-yne, 3-methyl-3-buten-1-yne, and 5-hexan-1-yne. For use in curable compositions, compounds which do not contain nitrogen atoms and sulfur atoms are preferably used because hydrosilation by compounds having hydrogen-silicon bonds proceeds smoothly.

When the functional groups are reacted with mercapto groups or mercaptide groups, appropriate catalysts or reaction conditions may be chosen without limitations depending on the functional groups. With respect to the reaction using mercapto groups or mercaptide groups, for example, methods described in, and methods described in the documents cited in "COMPREHENSIVE ORGANIC CHEMISTRY; The Synthesis and Reactions of Organic Compounds: Volume 3 Sulphur, Selenium, Silicon, Boron, Organometallic Compounds," D. NEVILLE JONES Ed., 1979, PERGAMON PRESS may be employed. Examples of methods which may be used include, but not limited to, a method in which a vinyl polymer having a mercapto group at the end is reacted with allylmercaptan in the presence of an oxidizing agent, such as oxygen or lead oxide, to synthesize a vinyl polymer having an allyl group via a disulfide bond at the end; a method in which a vinyl polymer having a mercaptide group at the end is reacted with allyl chloride by the Williamson method to synthesize a vinyl polymer having an allyl group at the end; a method in which a vinyl polymer having a mercapto group at the end is reacted with allyl isocyanate in the absence or in the presence of a catalyst, such as an organic tin compound to form a urethane, and thereby a vinyl polymer having an allyl group via a thiourethane bond at the end is synthesized; a method in which a vinyl polymer having a mercapto group at the end is added to N-allylmaleimide to synthesize a vinyl polymer having an allyl group at the end; a method in which a vinyl polymer having a mercapto group at the end is added to butadiene or isoprene to synthesize a vinyl polymer having an allyl group or methallyl group at the end; a method in which a vinyl polymer having a mercapto group or mercaptide group at the end is esterified with acrylic acid or methacrylic acid to synthesize a vinyl polymer having an acryloyl group or methacryloyl group at the end; a method in which a vinyl polymer having a mercapto group or mercaptide group at the end is transesterified with an acrylate ester or methacrylate ester to synthesize a vinyl polymer having an acryloyl group or methacryloyl group at the end; a method in which a vinyl polymer having a mercapto group at the end is reacted with allyl ethyl ketone under the acid conditions to synthesize a vinyl polymer having an allyl group via a thioketal bond at the end; a method in which a vinyl polymer having a mercapto group at the end and allyl alcohol are subjected to dehydrocondensation to synthesize a vinyl polymer having an allyl group at the end; a method in which a vinyl polymer having a mercapto group at the end is esterified with vinyl acetic acid to synthesize a vinyl polymer having a vinyl group at the end; a method in which a vinyl polymer having a mercapto group or mercaptide group at the end is transesterified with diallyl carbonate to synthesize a vinyl polymer having an allyl group via a carbonate bond at the end; and a method in which such a vinyl polymer having an allyl group via a carbonate bond at the end is decarbonated in the presence of palladium or a base to synthesize a vinyl polymer having an allyl group at the end.

The alkenyl-terminated vinyl polymer produced in the present invention preferably has a molecular-weight distribution of 2 or less, and more preferably 1.5 or less, because of ease of handling and satisfactory physical properties when cured. Herein, the molecular-weight distribution is defined by a value (Mw/Mn) obtained by dividing the weight-average molecular weight (Mw) by the number-average molecular weight (Mn), and is determined by gel permeation chromatography (GPC).

The alkenyl-terminated vinyl polymer produced in the present invention is preferably a telechelic polymer having alkenyl groups at both ends, because, when used as a curable composition, the physical properties of the cured composition are satisfactory.

In another aspect of the present invention, a curable composition includes three components (A), (B), and (C) below:

(A) an alkenyl-terminated vinyl polymer having an alkenyl group represented by general formula (3):

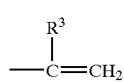

(3)

(wherein $R^3$ is a hydrogen atom or hydrocarbon group of 1 to 20 carbon atoms that may contain an ether bond or ester bond), at the end, which has been described above;
(B) a hydrogen-silicon bond-containing compound; and
(C) a hydrosilylation catalyst.

With respect to the component (A) of the curable composition of the present invention, any alkenyl-terminated vinyl polymer described above may be used without limitations. Because of satisfactory physical properties of the cured composition, the vinyl polymer preferably has a molecular-weight distribution of 2 or less, and more preferably 1.5 or less. Because of satisfactory physical properties of the cured composition, the vinyl polymer is preferably a telechelic polymer having alkenyl groups at both ends. The component (A), the alkenyl-terminated vinyl polymer, preferably has a number-average molecular weight in a range of 500 to 500,000, and more preferably, in a range of 1,000 to 100,000. When the number-average molecular weight of the vinyl polymer is less than 500, the original characteristics of the vinyl polymer are not easily exhibited, and in some cases, the viscosity is too low, resulting in a difficulty in handling. If the number-average molecular weight of the vinyl polymer exceeds 500,000, in some cases, the viscosity is too high and the solubility into a solvent or the like is too low, resulting in a difficulty in handling.

The component (B), the hydrogen-silicon bond-containing compound, used in the present invention is not particularly limited. Examples of compounds which may be used include a compound represented by general formula (16):

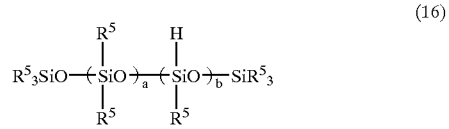

(16)

(wherein $R^5$ is a hydrogen atom, an alkyl group of 1 to 10 carbon atoms, an aryl group of 6 to 20 carbon atoms, an aralkyl group of 7 to 20 carbon atoms, or an alkoxy group of 1 to 10 carbon atoms; plural $R^5$'s in one molecule may be the same or different; a is an integer of 0 to 100; and b is an integer of 1 to 100), a compound represented by general formula (17):

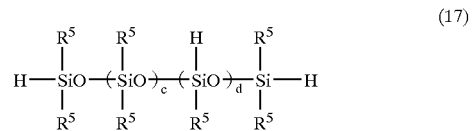

(17)

(wherein $R^5$ is a hydrogen atom, an alkyl group of 1 to 10 carbon atoms, an aryl group of 6 to 20 carbon atoms, an aralkyl group of 7 to 20 carbon atoms, or an alkoxy group of 1 to 10 carbon atoms; plural $R^5$'s in one molecule may be the same or different; c is an integer of 0 to 100; and d is an integer of 0 to 100), and a compound represented by general formula (18):

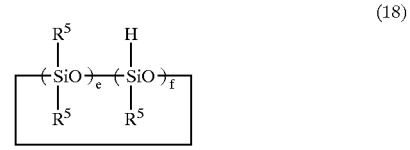

(18)

(wherein $R^5$ is a hydrogen atom, an alkyl group of 1 to 10 carbon atoms, an aryl group of 6 to 20 carbon atoms, an aralkyl group of 7 to 20 carbon atoms, or an alkoxy group of 1 to 10 carbon atoms; when plural $R^5$'s are present in one molecule, the plural $R^5$'s may be the same or different; e is an integer of 0 to 99; f is an integer of 1 to 100; and the relationship $3 \leq (e+f) \leq 100$ is satisfied). These compounds may be used alone or in combination.

As the component (B), the hydrogen-silicon bond-containing compound, preferably, a compound having at least two hydrogen-silicon bonds in one molecule is used because of satisfactory physical properties of the cured composition.

Specific examples of the component (B), the hydrogen-silicon bond-containing compound, which may be used in the present invention, include, but not limited to, dimethylsilane, diethylsilane, diphenylsilane, methylphenylsilane, 1,3-dihydrotetramethyldisiloxane, 1,5-dihydrohexamethyltrisiloxane, 1,3-dihydro-1,3-dimethyl-1,3-diphenyldisiloxane, 1,3,5-trihydro-1,1,5,5-tetramethyl-3-phenyltrisiloxane, 1,3,5-trihydropentamethyltrisiloxane, 1,3,5-trihydrotrimethylcyclotrisiloxane, 1,3,5,7-tetrahydrotetramethylcyclotetrasiloxane, 1,3,5-trihydrotriphenylcyclotrisiloxane, 1,3,5,7-tetrahydrotetraphenylcyclotetrasiloxane, α,ω-dihydropolymethylsiloxane, α,ω-dihydropolyethylsiloxane, α,ω-dihydropolyphenylsiloxane, 1,5-dihydro-3-vinylpentamethyltrisiloxane, methyl hydrogen silicone oil, 1,3-dihydrotetramethoxydisiloxane, 1,5-dihydrohexamethoxytrisiloxane, 1,5-dihydro-3-ethoxytetramethyltrisiloxane, 1,3,5,7-tetrahydrotetramethoxycyclotetrasiloxane, 1,3,5-trihydrotriethoxycyclotrisiloxane, α,ω-dihydropolymethoxysiloxane, dimethoxysilane, diethoxysilane, trimethoxysilane, triethoxysilane, methyldimethoxysilane, methyldiethoxysilane, phenyldimethoxysilane, phenyldiethoxysilane, 1,3-dihydro-1,3-dimethoxydimethyldisiloxane, 1,5-dihydro-3-methoxypentaphenyltrisiloxane, and compounds represented by general formulae (19):

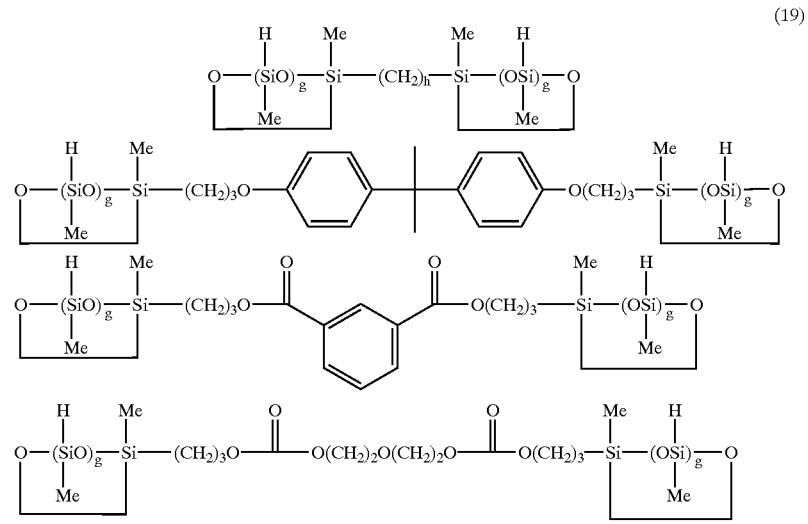

(wherein Me represents a methyl group; h is an integer of 4 to 10; g is an integer of 2 to 4; and g's may be the same or different).

In the present invention, when a compound having a hydrolyzable group, such as a hydroxyl group, a halogen atom, or an alkoxy group, is used as the component (B), i.e., the hydrogen-silicon bond-containing compound, curing can also be performed by the formation of a siloxane bond in the presence of a condensation catalyst, such as an organic tin compound.

In the curable composition of the present invention, any compositional ratio between the component (A), the vinyl polymer, and the component (B), the hydrogen-silicon bond-containing compound is acceptable. Because of satisfactory behavior during curing and satisfactory physical properties of the cured composition, the alkenyl group in the component (A) is preferably 0.2 to 5 equivalents, more preferably, 0.4 to 2.5 equivalents, and most preferably 0.8 to 1.5 equivalents, relative to the content of the hydrogen-silicon bond in the component (B). If the alkenyl content is less than 0.2 equivalents, since a large amount of active hydrogen-silicon bonds remains in the cured composition, cracks and voids easily occur, and it is difficult to obtain a uniform, rigid cured composition. If the alkenyl content exceeds 5 equivalents, curing tends to be insufficient, and the cured composition becomes tacky.

In the curable composition of the present invention, the component (C), the hydrosilylation catalyst, is not particularly limited, and any known catalyst may be used. Examples of hydrosilylation catalysts include peroxide polymerization initiators, such as cyclohexanone peroxide, 3,3,5-trimethyl cyclohexanone peroxide, methyl cyclohexanone peroxide, 1,1-bis(tert-butylperoxy)-3,3,5-trimethyl cyclohexane, 1,1-bis(tert-butylperoxy)cyclohexane, n-butyl-4,4,-bis(tert-butylperoxy)valerate, cumene hydroperoxide, 2,5-dimethylhexane-2,5-dihydroperoxide, 1,3-bis(tert-butylperoxy)-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl)peroxycarbonate, tert-butylperoxybenzoate, and 2,5-dimethyl-2,5-di(benzoylperoxy)hexane; azo polymerization initiators, such as 2,2'-azobis(isobutyronitrile), 1,1-azobis(cyclohexane-1-carbonitrile), azocumene, 2,2'-azobis(2-methylbutyronitrile), 2,2'-azobisdimethylvaleronitrile, 4,4'-azobis(4-cyanovaleric acid), 2-(tert-butylazo)-2-cyanopropane, 2,2'-azobis(2,4,4-trimethylpentane), 2,2'-azobis(2-methylpropane), and dimethyl 2,2'-azobis(2-methylpropionate); metal complexes selected from Group VIII transition metals, such as platinum, rhodium, cobalt, palladium, and nickel. In view of hydrosilylation reactivity, preferred are chloroplatinic acid (H$_2$PtCl$_6$.6H$_2$O), a platinum-vinylsiloxane complex, a platinum-olefin complex, platinum bisacetylacetonate, metallic Pt, RhCl(PPh$_3$)$_3$, RhCl$_3$, Rh/Al$_2$O$_3$, RuCl$_3$, IrCl$_3$, FeCl$_3$, AlCl$_3$, PdCl$_2$.2H$_2$O, NiCl$_2$, and TiCl$_4$. More preferred are metallic platinum-containing compounds, such as chloroplatinic acid (H$_2$PtCl$_6$.6H$_2$O), a platinum-vinylsiloxane complex, a platinum-olefin complex, and platinum bisacetylacetonate. Most preferred are a platinum-vinylsiloxane complex and a platinum-olefin complex. Herein, the platinum-vinylsiloxane complex is a generic name for a compound in which, as a ligand, siloxane, polysiloxane, cyclic siloxane, or the like containing a vinyl group in its molecule, coordinates to a platinum atom. Specific examples of the ligand include 1,1,3,3-tetramethyl-1,3-divinyldisiloxane. Specific examples of olefin ligands of platinum-olefin complexes include 1,5-hexadiene, 1,7-octadiene, 1,9-decadiene, 1,11-dodecadiene, and 1,5-cyclooctadiene. Among the ligands, 1,1,3,3-tetramethyl-1,3-divinyldisiloxane and 1,9-decadiene are particularly preferred because of their high catalytic activity. In the present invention, the hydrosilylation catalysts may be used alone or in combination. The amount of the hydrosilylation catalyst used is not particularly limited. The content of the hydrosilylation catalyst is preferably $10^{-1}$ to $10^{-8}$ equivalents, and more preferably $10^{-3}$ to $10^{-6}$ equivalents, relative to the alkenyl group in the component (A). If the content is less than $10^{-8}$ equivalents, curing may not be performed sufficiently. The content more than $10^{-1}$ equivalents is economically disadvantageous, and in some cases, coloration may occur.

Additionally, platinum-vinylsiloxane complexes and platinum-olefin complexes are disclosed in Japanese Examined Patent Application Publication No. 8-9006, etc.

By curing the curable composition of the present invention, it is possible to produce a uniform cured composition having excellent depth curability. The curing conditions are not particularly limited. In terms of balance between curing speed and operationality, the curing temperature is preferably −30° C. to 200° C., more preferably 0° C. to 150° C., and most preferably 30° C. to 120° C. Although the properties of the cured composition depend on the main chains, structures, functional groups, molecular weights, etc., of the component (A), the vinyl polymer, and the component (B), the hydrogen-silicon bond-containing compound, it is possible to widely control the properties, from rubber to resin.

The method for molding the curable composition of the present invention is not particularly limited, and any known molding method may be employed. Examples of molding methods include, but not limited to, cast molding, compression molding, transfer molding, injection molding, extrusion, rotational molding, hollow molding, blow molding, and thermoforming.

In the curable composition of the present invention, in addition to the components (A), (B), and (C), a compound having at least two alkenyl groups in one molecule may be used as an additive for adjusting the physical properties of the cured composition by hydrosilylation with the hydrogen-silicon bond. Examples of such a compound having at least two alkenyl groups in one molecule include, but not limited to, hydrocarbon compounds, such as butadiene, isoprene, chloroprene, 1,4-pentadiene, 1,5-hexadiene, 1,6-heptadiene, 1,7-octadiene, 1,8-nonadiene, 1,9-decadiene, 1,2-divinylbenzene, 1,4-divinylbenzene, 1,2-diallylbenzene, 1,4-diallylbenzene, 1,2-divinylcyclohexane, 1,4-divinylcyclohexane, 1,2-diallylcyclohexane, 1,4-diallylcyclohexane, 1,3,5-trivinylbenzene, 1,3,5-triallylbenzene, 1,2,4,5-tetravinylbenzene, 1,2,4,5-tetraallylbenzene, hexavinylbenzene, hexaallylbenzene, 1,4-divinylnaphthalene, 1,5-divinylnaphthalene, 1,4-diallylnaphthalene, 1,5-diallylnaphthalene, 1,8-divinylnaphthalene, 1,8-diallylnaphthalene, 9,10-divinylanthracene, 9,10-diallylanthracene, 3,3'-diallylbisphenol A, and 4-vinyl-α-methylstyrene; ether compounds, such as dially ether, divinyl ether, bisphenol A diallyl ether, 1,2-diallyloxybenzene, 1,4-diallyloxybenzene, trimethylolpropanediallyl ether, trimethylolpropanetriallyl ether, pentaerythritol diallyl ether, pentaerythritol triallyl ether, pentaerythritol tetraallyl ether, ethylene glycol diallyl ether, propylene glycol dially ether, diethylene glycol dially ether, dipropylene glycol allyl ether, polyethylene glycol diallyl ether, polypropylene glycol dially ether, and 1,6-hexanediol diallyl ether; ester compounds, such as diallyl terephthalate, diallyl phthalate, diallyl isophthalate, diallyl trimellitate, triallyl trimellitate, diallyl pyromellitate, triallyl pyromellitate, tetraallyl pyromellitate, diallyl succinate, diallyl oxalate, allyl vinyl acetate, allyl vinylpropionate, allyl acrylate, allyl methacrylate, diallyl carbonate, diethylene glycol diallyl carbonate, and diallyl dodecanedioate; and cyanurate compounds, such as triallyl isocyanurate, triallyl cyanurate, and trimethallyl isocyanurate.

In the curable composition of the present invention, in addition to the components (A), (B), and (C), a compound having a hydrogen-silicon bond and a crosslinkable silyl group in one molecule may be used as an additive for adjusting the physical properties of the cured composition by forming a siloxane bond. Examples of such a compound having a hydrogen-silicon bond and a crosslinkable silyl group in one molecule include, but not limited to, dimethoxymethylsilane, diethoxymethylsilane, trimethoxysilane, triethoxysilane, dimethoxysilane, diethoxysilane, dimethoxyphenylsilane, diethoxyphenylsilane, 1,1-dimethoxy-1,3,3-tetramethyldisiloxane, 1,1,1-trimethoxy-3,3-dimethyldisiloxane, pentamethoxydisiloxane, 1,3,5-trimethoxycyclotrisiloxane, 1,3,5,7-tetramethoxycyclotetrasiloxane, 1-dimethoxymethylsilyl-4-dimethylsilylbutane, 1-trimethoxysilyl-4-dimethylsilylbutane, dichloromethylsilane, and diacetoxymethylsilane. When the compound having a hydrogen-silicon bond and a crosslinkable silyl group in one molecule is used, in order to efficiently form a siloxane bond, a known condensation catalyst, such as an organic tin compound, may be used.

In the curable composition of the present invention, in addition to the components (A), (B), and (C), in order to adjust the properties, various additives, such as an antioxidant, a filler, a plasticizer, a property-adjusting agent, and a storage stability-improving agent, may be incorporated.

Examples of additives which may be used in the curable composition of the present invention include, but not limited to, organic tin stabilizers, such as a di-n-octyltin stabilizer, a di-n-butyltin stabilizer, and a dimethyltin stabilizer; lead stabilizers, such as a lead salt stabilizer;-metallic soap stabilizers, such as cadmium soap, zinc soap, barium soap, lead soap, complex metallic soap, and calcium stearate; monophenol antioxidants, such as 2,6-di-tert-butyl-p-cresol, butylated hydroxyanisole, 2,6-di-tert-butyl-4-ethylphenol, and steary-β-(3,5-di-tert-butyl-4-hydroxyphenyl)propionate; bisphenol antioxidants, such as 2,2'-methylenebis(4-methyl-6-tert-butylphenol), 2,2'-methylenebis(4-ethyl-6-tert-butylphenol), 4,4'-thiobis(3-methyl-6-tert-butylphenol), 4,4'-butylidenebis(3-methyl-6-tert-butylphenol), and 3,9-bis[1,1,-dimethyl-2-[β-(3-tert-butyl-4-hydroxy-5-methylphenyl)propionyloxy]ethyl]2,4,8,10-tetraoxaspiro[5,5]undecane; polymeric phenol antioxidants, such as 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, tetrakis-[methylene-3-(3',5'-di-tert-butyl-4'-hydroxyphenyl)propionate]methane, bis[3,3'-bis(4'-hydroxy-3'-tert-butylphenyl)butylic acid] glycol ester, 1,3,5-tris(3',5'-di-tert-butyl-4'-hydroxybenzyl)-S-triazine-2,4,6-(1H,3H,5H)trione, and tocopherols; sulfur-based antioxidants, such as dilauryl 3,3'-thiodipropionate, dimyristyl 3,3'-thiodipropionate, and distearyl 3,3'-thiodipropionate; phosphorus-based antioxidants, such as triphenyl phosphite, diphenylisodecyl phosphite, phenyldiisodecyl phosphite, 4,4'-butylidene-bis(3-methyl-6-tert-butylphenylditridecyl)phosphite, tris(nonylphenyl)phosphite, tris(dinonylphenyl)phosphite, diisodecylpentaerythritol diphosphite, 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-tert-butylphenyl)phosphite, cyclicneopentanetetraylbis(2,4-di-tert-butylphenyl)phosphite, cyclicneopentanetetraylbis(2,6-di-tert-butyl-4-methylphenyl)phosphite, and 2,2-methylenebis(4,6-di-tert-butylphenyl)octylphosphite; salicylic acid-based ultraviolet absorbers, such as phenyl salicylate, p-tert-butylphenyl salicylate, and p-octylphenyl salicylate; benzophenone-based ultraviolet absorbers, such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl)methane; benzotriazole-based ultraviolet absorbers, such as 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotoriazole, 2-(2'-hydroxy-3',5'-di-tert-amylphenyl) benzotriazole, 2-(2'-hydroxy-4'-octoxyphenyl) benzotriazole, 2-[2'-hydroxy-3'-(3",4",5",6"-tetrahydrophthalimidemethyl)-5'-methylphenyl] benzotriazole, 2,2-methylenebis[4-(1,1,3,3,-tetramethylbutyl)-6-(2H-benzotriazole-2-yl)phenol], [2-(2'-hydroxy-5'-methacryloxyphenyl)-2H-benzotriazole], and [2,2'-methylenebis[4-(1,1,3,3-tetramethylbutyl)-6-[(2H-benzotriazole-2-yl)phenol]]]; cyano acrylate-based ultraviolet absorbers, such as 2-ethylhexyl-2-cyano-3,3'-diphenyl acrylate, and ethyl-2-cyano-3,3'-diphenyl acrylate; nickel-based ultraviolet absorbers, such as nickelbis(octylphenyl) sulfide, [2,2'-thiobis(4-tert-octylphenolate)]-n-butylaminenickel, nickel complex-3,5-di-t-butyl-4-hydroxybenzyl-monoethylate phosphate, and nickel-dibutyldithiocarbamate; hindered amine light stabilizers (HALSs), such as bis(2,2,6,6,-tetramethyl-4-piperidyl)sebacate, Sanol LS-770 (manufactured by Sankyo), Adekasutabu LA-77 (manufactured by Asahi Denka), Sumisorb 577 (manufactured by Sumitomo Chemical), Biosorb 04 (manufactured by Kyodo Chemical), Chimassorb 944LD (manufactured by Ciba Specialty), Tinuvin 144 (manufactured by Ciba Specialty), Adekasutabu LA-52 (manufactured by Asahi Denka), Adekasutabu LA-57 (manufactured by Asahi Denka), Adekasutabu LA-67 (manufactured by Asahi Denka), Adekasutabu LA-68 (manufactured by Asahi Denka), Adekasutabu LA-77 (manufactured by Asahi Denka), Adekasutabu LA-87 (manufactured by Asahi Denka), and Goodrite UV-3034 (manufactured by Goodrich); nonionic antistats, such as poly(oxyethylene)alkylamine, poly(oxyethylene)alkylamide, poly(oxyethylene)alkyl ether, poly(oxyethylene)alkylphenyl ether, glycerin fatty acid ester, and sorbitan fatty acid ester; anionic antistats, such as alkylsulfonate, alkylbenzenesulfonate, alkylsulfate, and alkylphosphate; cationic antistats, such as quaternary ammonium chloride, quaternary ammonium sulfate, and quaternary ammonium nitrate; amphoteric antistats, such as alkyl betaine compounds, alkyl imidazoline compounds, and alkyl alanine compounds; conductive resin antistats, such as polyvinylbenzyl-type cationic compounds and polyacrylic acid-type cationic compounds; halogen fire retardants, such as tetrabromobisphenol A, 2,2-bis(4-hydroxy-3,5-dibromophenylpropane, hexabromobenzene, tris(2,3-dibromopropyl)isocyanurate, 2,2-bis(4-hydroxyethoxy-3,5-dibromophenyl)propane, decabromodiphenyl oxide, and halogen-containing polyphosphate; phosphorus fire retardants, such as ammonium phosphate, tricresyl phosphate, triethyl phosphate, tris(β-chloroethyl) phosphate, trichloroethyl phosphate, trisdichloropropyl phosphate, cresyldihenyl phosphate, xylenyldiphenyl phosphate, acid phosphate ester, and nitrogen-containing phosphorus compounds; inorganic fire retardants, such as red phosphorus, tin oxide, antimony trioxide, zirconium hydroxide, barium metaborate, aluminum hydroxide, and magnesium hydroxide; sioxane fire retardants, such as poly (dimethoxysiloxane), poly(diethoxysiloxane), poly (diphenoxysiloxane), poly(methoxyphenoxysiloxane), methyl silicate, ethyl silicate, and phenyl silicate; coloring agents, such as powdery coloring agents, granular coloring agents, liquid coloring agents, and masterbatch; organic blowing agents, such as azodicarbon amide, azobis(isobutyronitrile), N,N'-nitrosopentamethylenetetramine, p-toluenesulfonylhydrazine, and p,p'-oxybis(benzenesulfohydrazide); aliphatic hydrocarbon lubricants, such as liquid paraffin, microcrystalline wax, natural paraffin, synthetic paraffin, polyolefin wax, partial oxides thereof, fluorides thereof, and chlorides thereof; higher aliphatic alcohol and higher fatty acid lubricants, such as animal oil like beef tallow and fish oil, vegetable oil, like coconut oil, soybean oil, rape oil, and rice bran wax, refined products thereof, and montan wax; aliphatic amide lubricant, such as amides of higher fatty acids, and bisamides of higher fatty acids; metal soap lubricants, such as barium stearate, calcium stearate, zinc stearate, aluminum stearate, magnesium stearate, zinc stearate-barium stearate complex, and zinc stearate-calcium stearate complex; fatty acid ester lubricants, such as higher fatty acid esters of monohydric alcohol, higher fatty acid ester of polyhydric alcohol, higher fatty acid partial esters of monohydric alcohol, montan wax-type long-chain ester, and partial hydrolyzate of montan wax-type long-chain esters; mildewproofing agents, such as Vinyzene, Preventol, and thiabendazole; nucleating additives, such as sodium 2,2'-methylenebis(4,6-di-tert-butylphenyl)phosphate, sodium bis (4-tert-butylpheny)phosphate, bis(p-methylbenzylidene) sorbitol, alkyl-substituted dibenzylidene sorbitol, and bis(p-ehtylbenzilidene) sorbitol; vulcanization accelerators, such as hexamethylenetetramine, n-butylaldehydeaniline, 1,3-diphenylguanidine, di-o-tolylguanidine, 1-o-tolylbiguanide, di-o-tolylguanidine salt of dicatechol borate, N,N'-diphenylthiourea, 2-mercaptoimidazoline, N,N'-diethylthiourea, dibutylthiourea, dilaurylthiourea, 2-mercaptobenzothiazole, dibenzothiazyl disulfide, sodium salt of 2-mercaptobenzothiazole, zinc salt of 2-mercaptobenzothiazole, cyclohexylamine salt of 2-mercaptobenzothiazole, 2-(4'-morpholinodithio)benzothiazole, N-cyclohexyl-2-benzothiazolyl-sulfenamide, N-oxydiethylene-2-benzothiazolyl-sulfenamide, N-tert-butyl-2-benzothiazolyl-sulfenamide, tetramethylthiuram disulfide, tetraethylthiuram disulfide, tetrabutylthiuram disulfide, tetramethylthiuram monosulfide, dipentamethylenethiuram tetrasulfide, piperidine pentamethylenedithio carbamate, pipecoline pipecolyldithio carbamate, sodium dimethyldithio carbamate, sodium diethyldithio carbamate, sodium dibutyldithio carbamate, zinc dimethyldithio carbamate, zinc diethyldithio carbamate, zinc dibutyldithio carbamate, zinc N-ethyl-N-phenyldithio carbamate, and tellurium diethyldithio carbamate; antioxidants, such as poly(2,2,4-trimethyl-1,2-dihydroquinoline), 6-ethoxy-1,2-dihydro-2,2,4-trimethylquinoline, 1-(N-phenylamino)-naphthalene, styrenated diphenylamine, dialkyldiphenylamine, N,N'-diphenyl-p-phenylenediamine, N-phenyl-N'-isopropyl-p-phenylenediamine, N,N'-di-2-naphthyl-p-phenylenediamine, 2,6-di-tert-butyl-4-methylphenol, mono(α-metylbenzyl)phenol, di(α-metylbenzyl)phenol, tri(α-metylbenzyl)phenol, 2,2'-methylenebis(4-methyl-6-tert-butylphenol), 2,2'-methylenebis(4-ethyl-6-tert-butylphenol), 4,4'-butylidenebis(6-tert-butyl-3-methylphenol), 4,4'-thiobis(6-tert-butyl-3-methylphenol), 1,1-bis(4-hydroxyphenyl)cyclohexane, 2,5-di-tert-bubylhydroquinone, 2,5-di-tert-amylhydroquinone, 2-mercaptobenzimidazole, zinc salt of 2-mercaptobenzimidazole, 2-mercaptomethylbenzimidazole, nickel dibutyldithio carbamate, tris(nonylphenyl)phosphite, dilauryl thiodipropionate, distearyl thiodipropionate, Sunnoc, Suntight, and Ozoneguard G; vulcanizing agents, such as p-quinonedioxime, p,p'-dibenzoylquinonedioxime, 4,4'-dithiodimorpholine, poly p-dinitrosobenzene, 2-di-n-butylamino-4,6-dimercapto-1,3,5-triazine, 2,4,6-trimercapto-s-triazine, Tackirol 201, Hitanol 2501, and brominated alkylphenolformaldehyde resins; scorch retarders, such as N-nitrodiphenylamine and phthalic anhydride; peptizers, such as O,O'-dibenzamidediphenyl disulfide, zinc salt of 2-benzamidethiophenyl, and Pepter S; tackifiers, such as Tackirol 101, Hitanol 1501, modified-alkylphenolformaldehyde resins, and Hitanol 5501; latex coagulants, such as cyclohexylamine salt of acetic acid; processing aids, such as Ekusuton K1 and Ekusuton L-2; fillers, such as fine silica powder containing water, calcium silicate, furnace black, channel black, thermal lamp black, gas black, oil black, acetylene black, calcium carbonate, clay, talc, titanium oxide, zinc white, diatomaceous earth, and barium sulfate; plasticizers, such as dibutyl phthalate, diheptyl phthalate, di(2-ethylhexyl) phthalate, butyl benzyl phthalate, dioctyl adipate, dioctyl sebacate diethylene glycol dibenzoate, triethylene glycol dibenzoate, tricresylphosphate, tributylphosphate, chlorinated paraffins, alkyldiphenyl, and partially hydrogenated terphenyl; and storage stability-improving agent, such as benzothiazole and dimethyl maleate.

BEST MODE FOR CARRYING OUT THE INVENTION

While the present invention will be described based on the examples below, it is to be understood that the invention is not limited thereto. Hereinafter, the weight-average molecular weight (Mw), number-average molecular weight (Mn), and molecular-weight distribution (Mw/Mn) were determined by gel permeation chromatography (GPC) using chloroform as an eluent, and polystyrene gel columns. The analysis was carried out on the basis of polystyrene standards.

EXAMPLE 1

Into a 100 mL reactor equipped with an agitator, a thermometer, a nitrogen gas inlet tube, and a reflux condenser tube, was placed 28.3 g of methyl methacrylate, 40 mg of azobis(isobutyronitrile), 121 mg of 2-(2-phenyl) propyl dithiobenzoate, and 10 mL of toluene, and the reactor was nitrogen-purged. The reaction liquid was heated at 60° C. for 8 hours while being stirred. The reaction liquid was cooled to room temperature and then was poured into 100 mL of methanol. 12 g of poly(methyl methacrylate) (MW=35,800, Mn=29,800, and Mw/Mn=1.20) was produced. As a result of $^1$H NMR measurement, it was confirmed that a thiocarbonylthio structure was introduced into one end of poly(methyl methacrylate) and the introduction rate was 92% on the single-end basis.

10 g of the resultant polymer was dissolved in 40 mL of toluene. At room temperature, 3 g of diethylamine was added thereto, and the resultant mixture was stirred for 1 hour. The color of the solution was changed from tangerine to transparent and colorless. The mixture was further stirred for 4 hours at room temperature, and then devolatilized under reduced pressure. The $^1$H NMR measurement of the resultant polymer confirmed that the polymer was poly (methyl methacrylate) with a mercapto group at one end. The introduction rate of the mercapto group was 88% on the single-end basis.

8.5 g of poly(methyl methacrylate) with the mercapto group at one end thus obtained was dissolved in 40 mL of dehydrated toluene, and 22.9 mg of allyl isocyanate was added thereto in a nitrogen atmosphere. 3 mg of dibutyltin bis(acetylacetonate) was further added thereto, and the resultant mixture was heated at 80° C. for 8 hours while being stirred, followed by devolatilization under reduced pressure. The $^1$H NMR spectrum of the resultant polymer confirmed that the polymer was poly(methyl methacrylate) having an allyl group via a thiourethane bond at one end. The introduction rate of the allyl group was 83% on the single-end basis.

EXAMPLE 2

Into a 100 mL reactor equipped with an agitator, a thermometer, a nitrogen gas inlet tube, and a reflux condenser tube, was placed 18.0 g of n-butyl acrylate, 3 mg of azobis(isobutyronitrile), 20 mg of 1-phenylethyl dithiobenzoate, and 30 mL of toluene, and the reactor was nitrogen-purged. The reaction liquid was heated at 60° C. for 3 hours while being stirred. Toluene was removed from the reaction liquid by distillation under reduced pressure. 2.1 g of poly(n-butyl acrylate) (MW=38,000, Mn=33,800, and Mw/Mn=1.12) was produced. As a result of $^1$H NMR measurement, it was confirmed that a thiocarbonylthio structure was introduced into one end of poly(n-butyl acrylate) and the introduction rate was 97% on the single-end basis.

2 g of the resultant poly(n-butyl acrylate) was dissolved in 10 mL of toluene. At 0° C., 2 g of diethylamine was added thereto, and the resultant mixture was stirred for 6 hours, followed by devolatilization under reduced pressure. The $^1$H NMR measurement of the resultant polymer confirmed that the polymer was poly(n-butyl acrylate) with a mercapto group at one end. The introduction rate of the mercapto group was 95% on the single-end basis.

1.5 g of poly(n-butyl acrylate) with the mercapto group at one end thus obtained was dissolved in 10 mL of dehydrated toluene, and 4.4 mg of allyl isocyanate was added thereto in a nitrogen atmosphere. 0.5 mg of dibutyltin bis(acetylacetonate) was further added thereto, and the resultant mixture was heated at 80° C. for 10 hours while being stirred, followed by devolatilization under reduced pressure. The $^1$H NMR spectrum of the resultant polymer confirmed that the polymer was poly(n-butyl acrylate) having an allyl group via a thiourethane bond at one end. The introduction rate of the allyl group was 90% on the single-end basis.

EXAMPLE 3

Into a 100 mL reactor equipped with an agitator, a thermometer, a nitrogen gas inlet tube, and a reflux condenser tube, was placed 27.0 g of styrene, 9 mg of azobis (isobutyronitrile), and 68 mg of benzyl dithiobenzoate, and the reactor was nitrogen-purged. The reaction liquid was heated at 60° C. for 20 hours while being stirred. The reaction liquid was cooled to room temperature and then poured into 200 mL of methanol. 4.3 g of polystyrene (Mw=16,200, Mn=14,000, and Mw/Mn=1.16) was thereby produced. It was confirmed by the $^1$H NMR measurement that a thiocarbonylthio structure was introduced into one end and the introduction rate was 90% on the single-end basis.

2 g of the resultant polystyrene was dissolved in 40 mL of toluene. At room temperature, 2 g of diethylamine was added thereto, and the resultant mixture was stirred at 50° C. for 4 hours, followed by devolatilization under reduced pressure. The $^1$H NMR measurement of the resultant polymer confirmed that the polymer was polystyrene with a mercapto group at one end. The introduction rate of the mercapto group was 85% on the single-end basis.

2 g of polystyrene with the mercapto group at one end thus obtained was dissolved in 5 mL of dehydrated toluene, and 13.7 mg of allyl isocyanate was added thereto in an argon atmosphere. 1 mg of dioctyltin dilaurate was further added thereto, and the resultant mixture was heated at 70° C. for 8 hours while being stirred, followed by devolatilization under reduced pressure. The $^1$H NMR spectrum of the resultant polymer confirmed that the polymer was polystyrene having an allyl group via a thiourethane bond at one end. The introduction rate of the allyl group was 83% on the single-end basis.

EXAMPLE 4

Into a 300 mL reactor equipped with an agitator, a thermometer, a nitrogen gas inlet tube, a dropping funnel, and a reflux condenser tube, was placed 111 mg of sodium dodecylsulfate and 98 g of distilled water, and the reactor was nitrogen-purged while the reaction mixture was being heated at 80° C. and stirred. 217 mg of 2-(2-phenyl)propyl dithiobenzoate dissolved in 3.0 g of methyl methacrylate was added thereto, and after 20 minutes, 186 mg of 4,4'-azobis(4-cyanovaleric acid) and 5 g of distilled water were further added thereto. Stirring was performed at 80° C. for 30 minutes, and then 17.3 g of methyl methacrylate was dripped from the dropping funnel over 110 minutes. After 2 hours, the mixture was cooled to room temperature, salted out with sodium chloride, and washed with distilled water. 18.0 g of poly(methyl methacrylate) was produced. The GPC measurement confirmed that Mw=25,200, Mn=20,100, and Mw/Mn=1.25, and the $^1$H NMR measurement confirmed that a thiocarbonylthio structure was introduced into one end of poly(methyl methacrylate) and the introduction rate was 85% on the single-end basis.

10 g of the resultant poly(methyl methacrylate) was dissolved in 50 mL of toluene. At 0° C., 5 g of monoethylamine was added thereto, and the resultant mixture was stirred for 8 hours. The mixture was then heated to 60° C. and was devolatilized under reduced pressure. The $^1$H NMR measurement of the resultant polymer confirmed that the polymer was poly(methyl methacrylate) with a mercapto group at one end. The introduction rate of the mercapto group was 80% on the single-end basis.

9.5 g of poly(methyl methacrylate) with the mercapto group at one end thus obtained was dissolved in 20 mL of dehydrated toluene, and 7.9.5 mg of hexamethylene diisocyanate was added thereto in a nitrogen atmosphere. 3 mg of dibutyltin bis(acetylacetonate) was further added thereto, and the resultant mixture was heated at 80° C. for 6 hours while being stirred. 200 mg of allyl alcohol was added thereto, and the mixture was heated at 80° C. for 5 hours while being stirred, followed by devolatilization under reduced pressure. The $^1$H NMR spectrum of the resultant polymer confirmed that the polymer was poly(methyl methacrylate) having an allyl group via an urethane bond at one end. The introduction rate of the allyl group was 72% on the single-end basis. Additionally, GPC measurement confirmed that 3% poly(methyl methacrylate) was coupled by hexamethylene diisocyanate.

EXAMPLE 5

Into a 300 mL reactor equipped with an agitator, a thermometer, a nitrogen gas inlet tube, a dropping funnel, and a reflux condenser tube, was placed 110 mg of sodium dodecylsulfate and 100 g of distilled water, and the reactor was nitrogen-purged while the reaction mixture was being heated at 80° C. and stirred. 217 mg of 2-(2-phenyl)propyl dithiobenzoate dissolved in 3.0 g of methyl methacrylate was added thereto, and after 20 minutes, 185 mg of 4,4'-azobis(4-cyanovaleric acid) and 4 g of distilled water were further added thereto. Stirring was performed at 80° C. for 20 minutes, and then 17.5 g of methyl methacrylate was dripped from the dropping funnel over 90 minutes. After 30 minutes, 20.0 g of n-butyl acrylate was dripped from the dropping funnel over 1 hour. After stirring at 80° C. for 5 hours, the emulsion was salted out with sodium chloride, and washed with distilled water. 31.2 g of poly(methyl methacrylate)-poly(n-butyl acrylate) diblock copolymer was produced. The GPC measurement confirmed that Mw=66,000, Mn=44,300, and Mw/Mn was 1.49, and the $^1$H NMR measurement confirmed that a thiocarbonylthio structure was introduced into the poly(n-butyl acrylate) end of poly(methyl methacrylate)-poly(n-butyl acrylate) diblock copolymer, and the introduction rate was 82% on the single-end basis.

20 g of the resultant polymer was dissolved in 100 mL of toluene. 8 g of diethylamine was added thereto, and the resultant mixture was stirred for 2 hours at room temperature and for 3 hours at 50° C., followed by devolatilization under reduced pressure. The $^1$H NMR measurement of the resultant polymer confirmed that the polymer was poly(methyl methacrylate)-poly(n-butyl acrylate) diblock copolymer with a mercapto group at the poly(n-butyl acrylate) end. The introduction rate of the mercapto group was 77% on the single-end basis.

12 g of poly(methyl methacrylate)-poly(n-butyl acrylate) diblock copolymer with the mercapto group at the poly(n-butyl acrylate) end thus obtained was dissolved in 20 mL of dehydrated toluene, and 23.9 mg of allyl isocyanate was added thereto in a nitrogen atmosphere. 3 mg of dibutyltin bis(acetylacetonate) was further added thereto, and the resultant mixture was heated at 80° C. for 7 hours while being stirred, followed by devolatilization under reduced pressure. The $^1$H NMR spectrum of the resultant polymer confirmed that the polymer was poly(methyl methacrylate)-poly(n-butyl acrylate) diblock copolymer having an allyl group via a thiourethane bond at the poly(n-butyl acrylate) end. The introduction rate of the allyl group was 73% on the single-end basis.

EXAMPLE 6

Into a 100 mL reactor equipped with an agitator, a thermometer, a nitrogen gas inlet tube, and a reflux condenser tube, was placed 18.1 g of n-butyl acrylate, 3 mg of azobis(isobutyronitrile), 20 mg of 1-phenylethyl dithiobenzoate, and 30 mL of toluene, and the reactor was nitrogen-purged. The reaction liquid was heated at 60° C. for 3 hours while being stirred. Toluene was removed from the reaction liquid by distillation under reduced pressure, and thereby 2.1 g of poly(n-butyl acrylate) (Mw=39,200, Mn=33,900, and Mw/Mn=1.15) was produced. It was confirmed by the $^1$H NMR measurement that a thiocarbonylthio structure was introduced into one end of poly(n-butyl acrylate) and the introduction rate was 96% on the single-end basis.

1.0 g of poly(n-butyl acrylate) thus obtained was dissolved in 12 mL of dimethyl formamide, and the resultant solution together with 8.3 g of acrylic acid and 0.3 mg of azobis(isobutyronitrile) was placed in a glass ampule. The ampule was nitrogen-purged and sealed. After heating at 60° C. for 4 hours, the ampule was unsealed, and 3 g of dimethylamine was added therein, followed by stirring at 0° C. for 10 hours. By distillation under reduced pressure, a polymer was obtained. The $^1$H NMR measurement of the resultant polymer confirmed that the polymer was poly(n-butyl acrylate)-poly(acrylic acid) diblock copolymer with a mercapto group at the poly(acrylic acid) end. Upon methyl-esterification of the poly(acrylic acid) moiety, it was confirmed by GPC that Mw=63,500, Mn=50,100, and Mw/Mn=1.27. The introduction rate of the mercapto group was 72% on the single-end basis.

7 g of poly(n-butyl acrylate)-poly(acrylic acid) diblock copolymer with the mercapto group at the poly(acrylic acid) end thus obtained was dissolved in 10 mL of dehydrated toluene, and 11 mg of allylmercaptan was added thereto in an air atmosphere. 0.1 mg of lead dioxide was further added thereto, and the resultant mixture was heated at 80° C. for 9 hours while being stirred, followed by devolatilization under reduced pressure. The $^1$H NMR spectrum of the resultant polymer confirmed that the polymer was poly(n-butyl acrylate)-poly(acrylic acid) diblock copolymer having an allyl group via a disulfide bond at the poly(acrylic acid) end. The introduction rate of the allyl group was 70% on the single-end basis.

EXAMPLE 7

Into a 300 mL reactor equipped with an agitator, a thermometer, a nitrogen gas inlet tube, two syringe pumps, and a reflux condenser tube, was added 50 mg of sodium dodecylsulfate and 75 g of distilled water, and the reactor was nitrogen-purged while the reaction mixture was being heated at 80° C. and stirred. 155 mg of benzyl dithiobenzoate and 120 mg of 4,4'-azobis(4-cyanovaleric acid) dissolved in 3.7 g of styrene were added thereto, and stirring was performed at 80° C. for 10 minutes. 32.9 g of styrene was placed in one syringe pump and was added into the mixture at 0.20 mL/min, while 24 g of 1% sodium dodecylsulfate aqueous solution containing 210 mg of 4,4'-azobis(4-cyanovaleric acid) was added into the mixture at 0.09 mL/min. After addition was completed, stirring was performed at 80° C. for 2 hours, and the mixture was cooled to room temperature. 3 g of dibutylamine was added thereto, and the mixture was further stirred at room temperature for 3 hours with ammonia gas being injected into the mixture. The emulsion was then salted out with sodium chloride, and thereby 35.1 g of polystyrene was produced. GPC measurement confirmed that Mw=37,700, Mn=29,400, and Mw/Mn=1.28. $^1$H NMR measurement confirmed that a mercapto group was introduced into one end of polystyrene at an introduction rate of 90% (on the single-end basis).

20 g of polystyrene with the mercapto group at one end thus obtained was dissolved in 50 mL of dehydrate toluene, and 53 mg of allylmercaptan was added thereto in an air atmosphere. Stirring was performed at 80° C. for 30 hours with oxygen being injected into the mixture, followed by devolatilization under reduced pressure. The $^1$H NMR measurement of the resultant polymer confirmed that the polymer was polystyrene having an allyl group via a disulfide bond at one end. The introduction rate of the allyl group was 84% on the single-end basis.

EXAMPLE 8

Into a 100 mL reactor equipped with an agitator, a thermometer, a nitrogen gas inlet tube, and a reflux condenser tube, was placed 18.1 g of n-butyl acrylate, 4.0 mg of 1,1'-azobis(1-cyclohexanecarbonitrile), 63.5 mg of 1,4-bis (thiobenzoylthiomethyl)benzene, and 30 mL of toluene, and the reactor was nitrogen-purged. The reaction liquid was heated at 90° C. for 5 hours while being stirred. Toluene was removed from the reaction liquid by distillation under reduced pressure. 10 g of a polymer (MW=77,000, Mn=56, 900, and Mw/Mn=1.35) was thereby produced. $^1$H NMR measurement confirmed that thiocarbonylthio structures were introduced into both ends of poly(n-butyl acrylate) and the introduction rate was 93% on the both-ends basis.

3.0 g of poly(n-butyl acrylate) with the thiobarbonylthio structures at both ends was dissolved into 20 mL of toluene, and 3.3 g of monoethylamine was added thereto, and the resultant mixture was stirred at 10° C. for 5 hours. The $^1$H NMR measurement of the resultant polymer confirmed that the polymer was poly(n-butyl acrylate) with mercapto groups at both ends, and the introduction rate of the mercapto groups was 90% on the both-ends basis.

2.5 g of poly(n-butyl acrylate) with mercapto groups at both ends thus obtained was dissolved in 10 mL of dehydrated toluene, and 3.4 mg of allylmercaptan was added thereto in an air atmosphere. 0.1 mg of lead dioxide was further added thereto, and the resultant mixture was heated at 80° C. for 12 hours while being stirred, followed by devolatilization under reduced pressure. The $^1$H NMR spectrum of the resultant polymer confirmed that the polymer was poly(n-butyl acrylate) having allyl groups via disulfide bonds at both ends. The introduction rate of the allyl groups was 85% on the both-ends basis.

EXAMPLE 9

Into a 300 mL reactor equipped with an agitator, a thermometer, a nitrogen gas inlet tube, and a reflux condenser tube, was placed 90.5 g of n-butyl acrylate, 20 mg of 1,1'-azobis(1-cyclohexanecarbonitrile), 701 mg of 1,4-bis (thiobenzoylthiomethyl)benzene, and 140 mL of toluene, and the reactor was nitrogen-purged. The reaction liquid was heated at 90° C. for 40 hours while being stirred. The reaction liquid was sampled and it was confirmed by GPC measurement that a polymer (MW=56,500, Mn=41,100, and Mw/Mn=1.37) was produced. It was also confirmed by $^1$H NMR measurement that the thiocarbonylthio structures were introduced into both ends of poly(n-butyl acrylate) and the introduction rate was 85% on the both-ends basis.

Next, 75 g of diethylamine was added thereto, and the resultant mixture was stirred for 8 hours at 30° C. The $^1$H NMR measurement of the resultant polymer confirmed that the polymer was poly(n-butyl acrylate) with mercapto groups at both ends. The introduction rate of the mercapto groups was 90% on the both-ends basis.

50 g of poly(n-butyl acrylate) with mercapto groups at both ends thus obtained was dissolved in 130 mL of dehydrated toluene, and 190 mg of allylmercaptan was added thereto in an air atmosphere. 0.5 mg of lead dioxide was further added thereto, and the resultant mixture was heated at 80° C. for 12 hours while being stirred, followed by devolatilization under reduced pressure. The $^1$H NMR spectrum of the resultant polymer confirmed that the polymer was poly(n-butyl acrylate) having allyl groups via disulfide bonds at both ends. The introduction rate of the allyl groups was 88% on the both-ends basis.

Into 40 g of poly(n-butyl acrylate) having allyl groups at both ends, 100 mg of 1,3,5,7-tetrahydrotetramethylcyclotetrasiloxane and 0.25 mL of a xylene solution containing 3% by weight of platinum-1,3-divinyltetramethyldisiloxane complex were added, and mixed at room temperature, followed by deaeration under reduced pressure. The resultant mixture exhibited satisfactory fluidity at room temperature. The mixture was poured into a slab mold and heated at 120° C. for 3 hours to be cured. With respect to the physical properties of the cured composition, the modulus (100% elongation) was 0.24 MPa, the tensile strength at break was 0.53 MPa, the elongation at break was 221% (JIS No. 3 dumbbell; tensile testing speed 200 mm/min), and the JIS A hardness was 15. Regarding the oil resistance, increases in weight were 0.3% at room temperature/70 hr and 2.4% at 150° C./70 hr (JIS K 6820). The compression permanent set was 14% (JIS K 6262, at 150° C./72 hr).

EXAMPLE 10

Into a 300 mL reactor equipped with an agitator, a thermometer, a nitrogen gas inlet tube, and a reflux condenser tube, was placed 225.5 g of styrene and 1.37 g of 1,2,4,5-tetrakis(thiobenzoylthiomethyl)benzene, and the reactor was nitrogen-purged. The reaction mixture was heated at 100° C. for 20 hours while being stirred. Upon sampling, it was confirmed by GPC measurement that a polymer (MW=35,500, Mn=25,800, and Mw/Mn=1.38) was produced. The polymer was a star polymer with four branches, and it was confirmed by $^1$H NMR measurement that the polymer had a thiocarbonylthio structure at each end. The introduction rate of the thiocarbonylthio structure was 78% on the all-ends basis.

The reaction liquid was cooled to room temperature, and 12.5 g of a HALS was added thereto. The mixture was heated at 50° C. for 20 hours while being stirred. The polymer obtained by removing the solvent by distillation under reduced pressure was a star polymer with four branches, and it was confirmed by $^1$H NMR measurement that the polymer had a mercapto group at each end. The introduction rate of the mercapto group was 72% on the all-ends basis.

100 g of star polystyrene with the mercapto group at each end thus obtained was dissolved in 250 mL of dehydrated toluene, and 1.20 g of allylmercaptan was added thereto in an air atmosphere. 12 mg of lead dioxide was further added thereto, and the resultant mixture was heated at 80° C. for 12 hours while being stirred, followed by devolatilization under reduced pressure. The $^1$H NMR spectrum of the resultant polymer confirmed that the polymer was a star polystyrene having an allyl group via a disulfide bond at each end. The introduction rate of the allyl group was 68% on the all-ends basis.

Into a toluene solution of 95 g of star polystyrene having an allyl group at each end, 510 mg of 1,3,5,7-tetrahydrotetramethylcyclotetrasiloxane, 0.35 mL of a xylene solution containing 3% by weight of platinum-1,3-divinyltetramethyldisiloxane complex, and 85 mg of dimethylmaleate were added, and mixed at room temperature, followed by devolatilization under reduced pressure. The resultant resin was a reactive resin which exhibited thermoplastic behavior and repeatedly moldable at a temperature of 130° C. or less and which exhibited thermosetting behavior when molded at a temperature of 150° C. or more.

EXAMPLE 11

Into a 20 L pressure-resistant reactor equipped with an agitator, a thermometer, a pressure gauge, a nitrogen gas inlet tube, a monomer inlet tube, and a reflux condenser tube, was placed 155.3 g of a 3% pol(yvinyl alcohol) aqueous solution, 3.33 g of an alcohol solution of di-2-ethylhexylperoxydicarbonate, 9.32 g of O-ethyl-S-cyanomethyl xanthate, and 18,640 g of distilled water, and the reactor was nitrogen-purged. From the monomer inlet tube, 4,660 g of a vinyl chloride monomer was introduced into the reactor. The reaction liquid was heated to 57° C. and stirred for 10 hours. The unreacted monomer was removed by distillation, the suspension was filtered, and washed with methanol. 2,140 g of poly(vinyl chloride) was thereby produced. The results of GPC measurement with a tetrahydrofuran (THF) eluent were in that Mw=53,500, Mn=37,600, and Mw/Mn=1.42. The $^1$H NMR measurement confirmed that the resultant poly(vinyl chloride) had a thiocarbonylthio structure at one end and the introduction rate thereof was 82% on the single-end basis.

10 g of poly(vinyl chloride) was dissolved in 100 g of THF, and 1.5 g of diethylamine was added thereto, followed by stirring at room temperature for 10 hours. The resultant polymer was poly(vinyl chloride) with a mercapto group at one end. As a result of $^1$H NMR measurement, the introduction rate of the mercapto group was 78% on the single-end basis.

8.5 g of poly(vinyl chloride) with a mercapto group at one end thus obtained was dissolved in 40 mL of dehydrated THF, and 16.8 mg of allyl isocyanate was added thereto in a nitrogen atmosphere. 5 mg of dibutyltin bis(acetylacetonate) was further added thereto, and the resultant mixture was heated at 60° C. for 15 hours while being stirred, followed by devolatilization under reduced pressure. The $^1$H NMR spectrum of the resultant polymer confirmed that the polymer was poly(vinyl chloride) having an allyl group via a thiourethane bond at one end. The introduction rate of the allyl group was 73% on the single-end basis.

COMPARATIVE EXAMPLE 1

Into a 300 mL reactor equipped with an agitator, a thermometer, a nitrogen gas inlet tube, a syringe pump, and a reflux condenser tube, was added 40 g of styrene, 0.18 g of thioacetic acid, and 0.4 mg of tartaric acid, and the reactor was nitrogen-purged. A mixed solution of 4 g of a toluene solution of 3% thioacetic acid and 0.8 g of a methyl ethyl ketone solution of 2% 2,2'-azobis(2,4-dimethyl-4-methoxyvaleronitrile) was added thereto from the syringe pump over 6 hours while being heated at 70° C. and stirred. The mixture was further heated at 70° C. for 6 hours while being stirred, and was cooled to room temperature. The mixture was then poured into 200 mL of methanol, and polystyrene with a thioacetate ester at one end was thereby produced. The GPC measurement confirmed that Mw=655,000, Mn=283,000, and Mw/Mn=2.31. It was confirmed by the $^1$H NMR measurement that the introduction rate of the thioacetate ester was low at 52% on the single-end basis.

10 g of the resultant polystyrene was dissolved in a mixed solvent of 12.5 g of methanol and 37.5 g of toluene, and 0.1 g of a methanol solution of 10% sodium hydroxide was added thereto while being heated at 40° C. and stirred. Stirring was further performed at 40° C. for 2 hours, and polystyrene with a mercapto group at one end was produced. The $^1$H NMR measurement confirmed that the introduction rate of the mercapto group was low at 41% on the single-end basis.

COMPARATIVE EXAMPLE 2

100 g of polypropylene glycol having alkenyl groups at both ends with a number-average molecular weight of approximately 10,000, 1.2 g of 1,3,5,7-tetrahydrotetramethylcyclotetrasiloxane, and 0.61 mL of a xylene solution containing 3% by weight of platinum-1,3-divinyltetramethyldisiloxane complex were mixed at room temperature, followed by deaeration under reduced pressure. The resultant mixture was poured into a slab mold and heated at 120° C. for 3 hours to be cured. With respect to the physical properties of the cured composition, the modulus (100% elongation) was 0.36 MPa, the tensile strength at break was 0.51 MPa, the elongation at break was 123% (JIS No. 3 dumbbell; tensile testing speed 200 mm/min), and the JIS A hardness was 24. Regarding the oil resistance, increases in weight were 20% at room temperature/70 hr and 133% at 150° C./70 hr (JIS K 6820). The compression permanent set was unmeasurable because the original form was lost (JIS K 6262, at 150° C./72 hr).

In accordance with the production process of the present invention, since it is possible to easily produce an alkenyl-terminated vinyl polymer without using a metal compound requiring a complicated purification step, the production steps can be simplified. With respect to the alkenyl-terminated vinyl polymer of the present invention, since the molecular weight and the molecular-weight distribution can be controlled, the physical properties can be easily controlled. Since metal complexes or the like, which inhibit hydrosilylation, are not incorporated, it is not necessary to use a large amount of hydrosilylation catalyst. The curable compositions of the present invention have excellent workability and curability, and resultant cured compositions exhibit satisfactory mechanical characteristics, heat resistance, weathering resistance, light resistance, and oil resistance.

INDUSTRIAL APPLICABILITY

Moldings composed of curable compositions of the present invention, which exhibit rubber elasticity, can be used mainly for gaskets and packings in various fields. In the automobile field, examples of possible uses are, as body components, sealants for hermetic sealing, vibration isolating materials for glass, vibration isolating materials for car bodies, and in particular, window seal gaskets and gaskets for door glass; as chassis components, engine and suspension rubber for vibration and sound isolation, and in particular, engine mount rubber; and as engine components, hoses for cooling, fuel supply, exhaust emission control, etc., and sealants for engine oil. The moldings may also be used for exhaust gas cleaner parts, brake parts, etc. In the home electric appliance field, the moldings may be used as packings, O-rings, and belts. Specific examples are ornaments, waterproof packings, vibration-proof rubber, and insectproof packings for lighting equipment; vibration isolating materials, sound absorbing materials, and air seals for cleaners; drip-proof covers, waterproof packings, heater packings, electrode packings, and safety valve diaphragms for electric hot-water generators; hoses, waterproof packings, and solenoid valves for sake warmers; waterproof packings, feed-water tank packings, feed-water valves, water catch packings, connecting hoses, belts, heater packings, steam blowout hole seals, etc., for steam ovens and rice cookers with automatic keep warm features; oil packings, O-rings, drain packings, pressure tubes, blast tubes, inlet/outlet packings, vibration-proof rubber, fuel inlet packings, fuel gauge packings, feed tubes, diaphragm valves, air feed tubes, etc., for burners; and speaker gaskets, speaker edges, turntable sheets, belts, pulleys, etc., for audio equipment. In the electronics field, the moldings may be used as semiconductor sealants, potting materials, coating materials for light-emitting diodes, lenses, etc. In the architectural field, the moldings may be used as structural gaskets (zipper gaskets), materials for air dome structures, waterproof materials, molded sealants, vibration isolating materials, soundproofing materials, setting blocks, slider materials, etc. In the sports field, examples of uses are all-weather pavement materials, gymnasium floor materials, etc., for sports floors; sole materials, inner sole materials, etc., for sports shoes; balls used in ball games, such as golf balls; racket grips; and racket rubber. In the vibration-proof rubber fields, the moldings may be used as vibration-proof rubber for automobiles, vibration-proof rubber for railroad vehicles, vibration-proof rubber for airplanes, fenders, etc. In the marine engineering fields, examples of uses are, as structural materials, rubber expansion joints, water stops, waterproof sheets, rubber dams, elastic pavement materials, vibration-proof pads, fenders, etc.; as submaterials for engineering work, rubber mold forms, rubber packers, rubber skirts, sponge mats, mortar hoses, mortar strainers, etc.; as auxiliary materials for engineering work, rubber sheets, air hoses, etc.; as products for safety, rubber buoys, wave absorbers, etc.; and as products for environmental protection, oil fences, silt fences, stainproofing materials, marine hoses, dredging hoses, oil skimmers, etc. The moldings may also be used as plate rubber, mats, foams, and the like. Applicable uses are not limited thereto.

What is claimed is:

1. A process for producing an alkenyl-terminated vinyl polymer comprising introducing an alkenyl group represented by general formula (3):

(3)

(wherein $R^3$ is a hydrogen atom or hydrocarbon group of 1 to 20 carbon atoms that may contain an ether bond or ester bond), into a vinyl polymer having a thiocarbonylthio structure selected from the group consisting of a vinyl polymer represented by general formula (1):

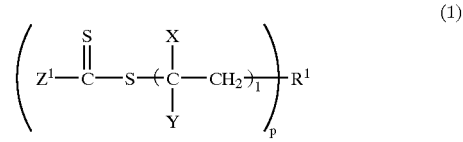
(1)

(wherein $R^1$ is a polyvalent organic group (p>1) which may contain a nitrogen atom, oxygen atom, sulfur atom, halogen atom, silicon atom, phosphorus atom, and metal atom, and may be a polymer, or $R^1$ may be a hydrogen atom or halogen atom for p=1; $Z^1$ is a hydrogen atom, halogen atom, or monovalent organic group which may contain a nitrogen atom, oxygen atom, sulfur atom, halogen atom, silicon atom, and phosphorus atom, and may be a polymer; X is a hydrogen atom, halogen atom, or monovalent organic group which may contain a nitrogen atom, oxygen atom, sulfur atom, halogen atom, and silicon atom; Y is a hydrogen atom, halogen atom, or monovalent organic group which may contain a nitrogen atom, oxygen atom, sulfur atom, halogen atom, and silicon atom; p is an integer of 1 or more; l is an integer of 5 or more; and when plural X's, Y's, and $Z^1$'s are present, the plural X's, Y's, and $Z^1$'s may be each the same or different), and a vinyl polymer represented by general formula (2):

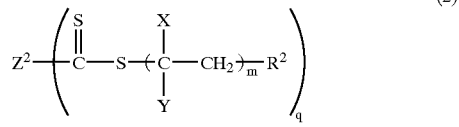

(2)

(wherein $R^2$ is a hydrogen atom, halogen atom, or monovalent organic group which may contain a nitrogen atom, oxygen atom, sulfur atom, halogen atom, silicon atom, phosphorus atom, and metal atom, and may be a polymer; $Z^2$ is a sulfur atom (when q=2), oxygen atom (when q=2), nitrogen atom (when q=3), or polyvalent organic group which may contain a nitrogen atom, oxygen atom, sulfur atom, halogen atom, silicon atom, and phosphorus atom, and may be a polymer; X is a hydrogen atom, halogen atom, or monovalent organic group which may contain a nitrogen atom, oxygen atom, sulfur atom, halogen atom, and silicon atom; Y is a hydrogen atom, halogen atom, or monovalent organic group which may contain a nitrogen atom, oxygen atom, sulfur atom, halogen atom, and silicon atom; q is an integer of 2 or more; m is an integer of 5 or more; and plural X's, Y's, and $R^2$'s may be each the same or different);

wherein the thiocarbonylthio group of the vinyl polymer having the thiocarbonylthio structure is converted into a mercapto group or a mercaptide group, and the mercapto group or the mercaptide group is allowed to react with an alkenyl-containing compound.

2. The process for producing an alkenyl-terminated vinyl polymer according to claim 1, wherein the vinyl polymer having the thiocarbonylthio structure is a polymer represented by general formula (4):

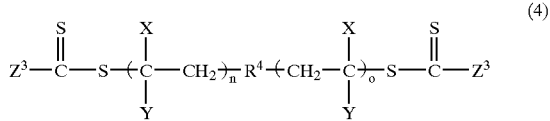

(4)

(wherein $R^4$ is a divalent organic group which may contain a nitrogen atom, oxygen atom, sulfur atom, halogen atom, silicon atom, phosphorus atom, and metal atom, and may be a polymer; each $Z^3$ is a hydrogen atom, halogen atom, or monovalent organic group which may contain a nitrogen atom, oxygen atom, sulfur atom, halogen atom, silicon atom, and phosphorus atom, and may be a polymer; each X is a hydrogen atom, halogen atom, or monovalent organic group which may contain a nitrogen atom, oxygen atom, sulfur atom, halogen atom, and silicon atom; each Y is a hydrogen atom, halogen atom, or monovalent organic group which may contain a nitrogen atom, oxygen atom, sulfur atom, halogen atom, and silicon atom; n and o are each an integer of 5 or more; and plural X's and Y's may be the same or different).

3. The process for producing an alkenyl-terminated vinyl polymer according to claim 1, wherein the vinyl polymer having the thiocarbonylthio structure is prepared by radical-polymerizing a vinyl monomer represented by general formula (7):

(7)

(wherein X is a hydrogen atom, halogen atom, or monovalent organic group which may contain a nitrogen atom, oxygen atom, sulfur atom, halogen atom, and silicon atom; and Y is a hydrogen atom, halogen atom, or monovalent organic group which may contain a nitrogen atom, oxygen atom, sulfur atom, halogen atom, and silicon atom), in the presence of a compound having a thiocarbonylthio structure selected from the group consisting of a compound represented by general formula (5):

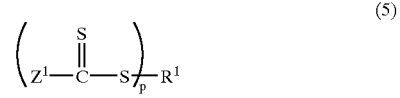

(5)

(wherein $R^1$ is a polyvalent organic group (p>1) of 1 or more carbon atoms which may contain a nitrogen atom, oxygen atom, sulfur atom, halogen atom, silicon atom, phosphorus atom, and metal atom, and may be a polymer; $Z^1$ is a hydrogen atom, halogen atom, or monovalent organic group (p=1) of 1 or more carbon atoms which may contain a nitrogen atom, oxygen atom, sulfur atom, halogen atom, silicon atom, and phosphorus atom, and may be a polymer; p is an integer of 1 or more; and when plural X's are present, the plural X's may be each the same or different), and a compound represented by general formula (6):

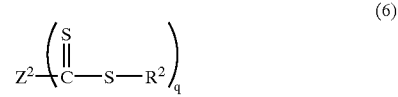

(6)

(wherein $R^2$ is a monovalent organic group of 1 or more carbon atoms which may contain a nitrogen atom, oxygen atom, sulfur atom, halogen atom, silicon atom, phosphorus atom, and metal atom, and may be a polymer; $Z^2$ is a sulfur atom (when q=2), oxygen atom (when q=2), nitrogen atom (when q=3), or polyvalent organic group of 1 or more carbon atoms which may contain a nitrogen atom, oxygen atom, sulfur atom, halogen atom, silicon atom, and phosphorus atom, and may be a polymer; q is an integer of 2 or more; and plural $R^2$'s may be the same or different).

4. The process for producing an alkenyl-terminated vinyl polymer according to claim 1, wherein the thiocarbonylthio group of the vinyl polymer having the thiocarbonylthio structure is converted into a mercapto group or a mercaptide group with a compound selected from the group consisting of bases and acids.

5. The process for producing an alkenyl-terminated vinyl polymer according to claim 1, wherein the thiocarbonylthio group of the vinyl polymer having the thiocarbonylthio structure is converted into a mercapto group or a mercaptide group with a compound selected from the group consisting of ammonia, hydrazine, primary amines, and secondary amines.

6. The process for producing an alkenyl-terminated vinyl polymer according to claim 1, wherein the thiocarbonylthio group of the vinyl polymer having the thiocarbonylthio structure is converted into a mercapto group or a mercaptide group with a compound selected from the group consisting of primary amines with a boiling point of 100° C. or less, secondary amines with a boiling point of 100° C. or less, and hindered amine light stabilizers (HALSs).

7. The process for producing an alkenyl-terminated vinyl polymer according to claim 1, wherein the alkenyl-containing compound contains in its molecule at least one structure selected from the group consisting of a hydroxyl group, a carboxyl group, an alkoxycarbonyl group (ester bond), a mercapto group, a thionester bond, a thiolester bond, a dithioester bond, an isocyanato group, an isothiocyanato group, a carbonyl group, an aldehyde group, an aryloxy group, a quaternary ammonium ion, a sulfone bond, a halogen atom, a carbon-carbon double bond, and a carbon-carbon triple bond.

8. An alkenyl-terminated vinyl polymer produced by a production process according to claim 1, wherein the vinyl polymer has a molecular-weight distribution of 2 or less, the molecular-weight distribution being determined by gel permeation chromatography (GPC).

9. The alkenyl-terminated vinyl polymer according to claim 8, wherein the vinyl polymer has a molecular-weight distribution of 1.5 or less, the molecular-weight distribution being determined by gel permeation chromatography (GPC).

10. A telechelic vinyl polymer having alkenyl groups at both ends which is produced by a production process according to claim 1.

* * * * *

UNITED STATES PATENT AND TRADEMARK OFFICE
CERTIFICATE OF CORRECTION

PATENT NO. : 7,009,004 B2  Page 1 of 1
APPLICATION NO. : 10/469345
DATED : March 7, 2006
INVENTOR(S) : Tsuji et al.

It is certified that error appears in the above-identified patent and that said Letters Patent is hereby corrected as shown below:

| Column | Line | |
|---|---|---|
| (Title Page) | 54 | Change "END VINYL" to --END, VINYL--. |
| 1 | 3 | Change "END VINYL" to --END, VINYL--. |
| 10 | 34 | Change "α-methlsyrene" to --α-methylstyrene--. |
| 11 | 18 | Change "(wherein" to --wherein--. |
| 14 | 12 | Change "sufonate" to --sulfonate--. |
| 30 | 15 | Change "sioxane" to --siloxane--. |
| 31 | 6 | Change "metylbenzyl" to --methylbenzyl--. |
| 31 | 6 | Change "metylbenzyl" to --methylbenzyl--. |
| 31 | 7 | Change "metylbenzyl" to --methylbenzyl--. |
| 34 | 5 | Change "an urethane" to --a urethane--. |
| 38 | 13 | Change "pol(yvinyl alcohol)" to --poly(vinyl alcohol)--. |

Signed and Sealed this

Twenty-second Day of August, 2006

JON W. DUDAS
*Director of the United States Patent and Trademark Office*